(12) United States Patent
Huitema et al.

(10) Patent No.: US 7,493,363 B2
(45) Date of Patent: Feb. 17, 2009

(54) PEER-TO-PEER GROUP MANAGEMENT AND METHOD FOR MAINTAINING PEER-TO-PEER GRAPHS

(75) Inventors: Christian Huitema, Clyde Hill, WA (US); Alexandru Gavrilescu, Redmond, WA (US); Noel W. Anderson, Bellevue, WA (US); Xiaohai Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1359 days.

(21) Appl. No.: 09/955,923

(22) Filed: Sep. 19, 2001

(65) Prior Publication Data

US 2003/0055892 A1 Mar. 20, 2003

(51) Int. Cl.
 *G06F 15/16* (2006.01)
(52) U.S. Cl. .................. 709/204; 709/230; 709/245
(58) Field of Classification Search ......... 709/204–205, 709/237, 243, 230, 245
 See application file for complete search history.

(56) References Cited

U.S. PATENT DOCUMENTS

| | | | |
|---|---|---|---|
| 5,369,705 A * | 11/1994 | Bird et al. | 713/163 |
| 5,371,794 A | 12/1994 | Diffie et al. | |
| 5,386,542 A | 1/1995 | Brann et al. | |
| 5,712,914 A | 1/1998 | Aucsmith et al. | |
| 5,748,736 A | 5/1998 | Mittra | |
| 5,761,421 A | 6/1998 | van Hoff et al. | |
| 5,806,075 A | 9/1998 | Jain et al. | |
| 5,832,514 A | 11/1998 | Norin et al. | |
| 5,854,898 A * | 12/1998 | Riddle | 709/231 |
| 5,901,227 A | 5/1999 | Perlman | |
| 5,907,685 A | 5/1999 | Douceur | |

(Continued)

FOREIGN PATENT DOCUMENTS

EP 1248441 10/2002

(Continued)

OTHER PUBLICATIONS

Tyson, "How the Old Napster Worked", http://computer.howstuffworks.com/napster.htm/printable.*

(Continued)

*Primary Examiner*—Andrew Caldwell
*Assistant Examiner*—Douglas Blair
(74) *Attorney, Agent, or Firm*—Marshall, Gerstein & Borun LLP

(57) ABSTRACT

A system and method of serverless peer-to-peer group management and maintenance is presented. Group formation and discovery of private, public, and enumerated groups are provided, as is a method of joining such a peer-to-peer group. Group information management provided by the present invention ensures that each node maintains a current database from the initial joining of the group through the run phase of membership. Group graph maintenance utilizes a group signature to ensure that partitions in a graph may be detected and repaired. The utility of connections within the graph are also monitored so that non-productive connections may be dropped to increase the efficiency of the group. The diameter of the graph is also monitored and adjusted to ensure rapid information transfer throughout the group. A disconnect procedure is used to maintain the graph integrity and prevent partitions resulting from the departure of a group member.

10 Claims, 13 Drawing Sheets

U.S. PATENT DOCUMENTS

| | | | |
|---|---|---|---|
| 5,917,480 A | 6/1999 | Tafoya et al. | |
| 5,922,074 A | 7/1999 | Richard et al. | |
| 5,933,849 A | 8/1999 | Srbljic et al. | |
| 5,944,794 A | 8/1999 | Okamoto et al. | |
| 5,982,898 A | 11/1999 | Hsu et al. | |
| 5,987,376 A | 11/1999 | Olson et al. | |
| 6,012,096 A | 1/2000 | Link et al. | |
| 6,016,505 A | 1/2000 | Badovinatz et al. | |
| 6,044,350 A | 3/2000 | Weiant, Jr. et al. | |
| 6,078,948 A | 6/2000 | Podgorny et al. | |
| 6,081,845 A | 6/2000 | Kanemaki et al. | |
| 6,085,320 A | 7/2000 | Kaliski, Jr. | |
| 6,088,805 A | 7/2000 | Davis et al. | |
| 6,092,201 A | 7/2000 | Turnbull et al. | |
| 6,097,811 A | 8/2000 | Micali | |
| 6,108,687 A | 8/2000 | Craig | |
| 6,128,740 A | 10/2000 | Curry et al. | |
| 6,134,658 A | 10/2000 | Multerer et al. | |
| 6,141,760 A * | 10/2000 | Abadi et al. | 726/14 |
| 6,148,383 A | 11/2000 | Micka et al. | |
| 6,155,840 A | 12/2000 | Sallette | |
| 6,163,809 A * | 12/2000 | Buckley | 709/237 |
| 6,205,481 B1 | 3/2001 | Heddaya et al. | |
| 6,216,110 B1 | 4/2001 | Silverberg | |
| 6,237,025 B1 | 5/2001 | Ludwig | |
| 6,266,420 B1 | 7/2001 | Langford et al. | |
| 6,269,099 B1 | 7/2001 | Borella et al. | |
| 6,311,209 B1 | 10/2001 | Olson et al. | |
| 6,336,141 B1 | 1/2002 | Fujiyama et al. | |
| 6,351,813 B1 | 2/2002 | Mooney et al. | |
| 6,363,352 B1 | 3/2002 | Dailey et al. | |
| 6,470,375 B1 | 10/2002 | Whitner et al. | |
| 6,490,253 B1 | 12/2002 | Miller et al. | |
| 6,526,411 B1 * | 2/2003 | Ward | 707/102 |
| 6,529,950 B1 | 3/2003 | Lumelsky et al. | |
| 6,532,217 B1 | 3/2003 | Alkhatib et al. | |
| 6,560,636 B2 | 5/2003 | Cohen et al. | |
| 6,581,110 B1 | 6/2003 | Harif et al. | |
| 6,636,854 B2 | 10/2003 | Dutta et al. | |
| 6,636,889 B1 | 10/2003 | Estrada et al. | |
| 6,653,933 B2 | 11/2003 | Raschke et al. | |
| 6,654,796 B1 | 11/2003 | Slater et al. | |
| 6,658,568 B1 * | 12/2003 | Ginter et al. | 713/193 |
| 6,675,205 B2 * | 1/2004 | Meadway et al. | 709/219 |
| 6,675,261 B2 | 1/2004 | Shandony | |
| 6,683,865 B1 | 1/2004 | Garcia-Luna-Aceves et al. | |
| 6,701,344 B1 * | 3/2004 | Holt et al. | 709/204 |
| 6,714,966 B1 * | 3/2004 | Holt et al. | 709/204 |
| 6,728,753 B1 | 4/2004 | Parasnis et al. | |
| 6,745,178 B1 | 6/2004 | Emens et al. | |
| 6,748,530 B1 | 6/2004 | Aoki et al. | |
| 6,754,829 B1 | 6/2004 | Butt et al. | |
| 6,775,782 B1 | 8/2004 | Buros et al. | |
| 6,791,582 B2 | 9/2004 | Linsey et al. | |
| 6,801,604 B2 | 10/2004 | Maes et al. | |
| 6,823,327 B1 | 11/2004 | Klug et al. | |
| 6,912,622 B2 | 6/2005 | Miller | |
| 6,920,455 B1 | 7/2005 | Weschler | |
| 6,968,179 B1 | 11/2005 | De Vries | |
| 6,976,258 B1 | 12/2005 | Goyal et al. | |
| 6,981,043 B2 | 12/2005 | Botz et al. | |
| 6,983,400 B2 | 1/2006 | Volkov | |
| 6,990,514 B1 | 1/2006 | Dodrill et al. | |
| 7,062,681 B2 | 6/2006 | Larsson et al. | |
| 7,065,579 B2 * | 6/2006 | Traversat et al. | 709/230 |
| 7,065,587 B2 | 6/2006 | Huitema et al. | |
| 7,068,789 B2 | 6/2006 | Huitema et al. | |
| 7,073,132 B1 | 7/2006 | Rydahl et al. | |
| 7,130,999 B2 | 10/2006 | Yasala et al. | |
| 7,139,760 B2 | 11/2006 | Manion et al. | |
| 7,159,223 B1 | 1/2007 | Comeau et al. | |
| 7,181,620 B1 | 2/2007 | Hur | |
| 7,185,194 B2 * | 2/2007 | Morikawa et al. | 713/156 |
| 7,197,049 B2 * | 3/2007 | Engstrom et al. | 370/469 |
| 7,213,060 B2 | 5/2007 | Kemp et al. | |
| 7,272,636 B2 * | 9/2007 | Pabla | 709/216 |
| 7,299,351 B2 | 11/2007 | Huitema et al. | |
| 7,340,500 B2 * | 3/2008 | Traversat et al. | 709/201 |
| 7,401,152 B2 * | 7/2008 | Traversat et al. | 709/230 |
| 7,401,153 B2 * | 7/2008 | Traversat et al. | 709/230 |
| 2001/0003191 A1 | 6/2001 | Kovacs et al. | |
| 2001/0035976 A1 | 11/2001 | Poon | |
| 2001/0053213 A1 | 12/2001 | Truong et al. | |
| 2002/0073204 A1 * | 6/2002 | Dutta et al. | 709/227 |
| 2002/0078243 A1 | 6/2002 | Rich et al. | |
| 2002/0097267 A1 | 7/2002 | Dinan et al. | |
| 2002/0140730 A1 | 10/2002 | Linsey et al. | |
| 2002/0143989 A1 * | 10/2002 | Huitema et al. | 709/243 |
| 2002/0144149 A1 | 10/2002 | Hanna et al. | |
| 2002/0154172 A1 | 10/2002 | Linsey et al. | |
| 2002/0184358 A1 | 12/2002 | Traversat et al. | |
| 2002/0188657 A1 | 12/2002 | Traversat et al. | |
| 2002/0188881 A1 | 12/2002 | Liu et al. | |
| 2002/0194484 A1 | 12/2002 | Bolosky et al. | |
| 2003/0014485 A1 | 1/2003 | Banatwala | |
| 2003/0036941 A1 | 2/2003 | Leska et al. | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088544 A1 * | 5/2003 | Kan et al. | 707/3 |
| 2003/0126027 A1 | 7/2003 | Nelson et al. | |
| 2003/0135629 A1 | 7/2003 | Sasaki et al. | |
| 2003/0140119 A1 | 7/2003 | Acharya et al. | |
| 2003/0147386 A1 | 8/2003 | Zhang et al. | |
| 2003/0191753 A1 | 10/2003 | Hoch | |
| 2003/0196060 A1 | 10/2003 | Miller | |
| 2003/0217073 A1 | 11/2003 | Walther et al. | |
| 2004/0064693 A1 | 4/2004 | Pabla et al. | |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0100953 A1 | 5/2004 | Chen et al. | |
| 2004/0111423 A1 | 6/2004 | Irving et al. | |
| 2004/0111469 A1 | 6/2004 | Manion et al. | |
| 2004/0111515 A1 | 6/2004 | Manion et al. | |
| 2004/0111525 A1 | 6/2004 | Berkland et al. | |
| 2004/0117446 A1 | 6/2004 | Swanson | |
| 2004/0120344 A1 | 6/2004 | Sato et al. | |
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0133640 A1 | 7/2004 | Yeager et al. | |
| 2004/0141005 A1 | 7/2004 | Banatwala et al. | |
| 2004/0143603 A1 | 7/2004 | Kaufmann et al. | |
| 2004/0148333 A1 | 7/2004 | Manion et al. | |
| 2004/0148611 A1 | 7/2004 | Manion et al. | |
| 2004/0172455 A1 | 9/2004 | Green et al. | |
| 2004/0172456 A1 | 9/2004 | Green et al. | |
| 2004/0184445 A1 | 9/2004 | Burne | |
| 2004/0205243 A1 | 10/2004 | Hurvig et al. | |
| 2004/0242329 A1 | 12/2004 | Blackburn et al. | |
| 2004/0249970 A1 | 12/2004 | Castro et al. | |
| 2004/0260771 A1 | 12/2004 | Gusler et al. | |
| 2005/0004984 A1 * | 1/2005 | Simpson | 709/205 |
| 2005/0009537 A1 | 1/2005 | Crocker et al. | |
| 2005/0027805 A1 | 2/2005 | Aoki | |
| 2005/0038856 A1 | 2/2005 | Krishnasamy et al. | |
| 2005/0066001 A1 | 3/2005 | Benco et al. | |
| 2005/0080768 A1 | 4/2005 | Zhang et al. | |
| 2005/0080859 A1 | 4/2005 | Lake | |
| 2005/0086300 A1 | 4/2005 | Yeager et al. | |
| 2005/0102245 A1 | 5/2005 | Edlund et al. | |
| 2005/0102356 A1 | 5/2005 | Manion et al. | |
| 2005/0114487 A1 | 5/2005 | Peng et al. | |

| | | | |
|---|---|---|---|
| 2005/0125529 | A1 | 6/2005 | Brockway et al. |
| 2005/0125560 | A1 | 6/2005 | Brockway et al. |
| 2005/0171799 | A1 | 8/2005 | Hull et al. |
| 2005/0198173 | A1 | 9/2005 | Evans |
| 2005/0235038 | A1 | 10/2005 | Donatella et al. |
| 2008/0031460 | A1 | 2/2008 | Brookner et al. |

FOREIGN PATENT DOCUMENTS

| | | |
|---|---|---|
| GB | 2378268 | 2/2003 |
| JP | 2002197246 | 11/2001 |
| JP | 2002335269 | 11/2002 |
| WO | WO-0120450 | 3/2001 |
| WO | WO-2004009550 A1 | 7/2004 |
| WO | WO-2005/046164 A1 | 5/2005 |

OTHER PUBLICATIONS

"The Gnutella Protocol Specification v0.4", http://www.clip2.com.*

"Publication Related to Pastry", http://research.microsoft.com/~antr/Pastry/pubs.htm.*

Adam Langley, "The Freenet Protocol", the Free Network Project, May 21, 2001.*

Druschel et al., "PAST: A Large-Scale, Persistent Peer-to-Peer STorage Utility", HotOS VIII, SChoss Elmau, Germany, May 2001.*

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redback.html (last visited Mar. 5, 2002).

Lai, Kevin, and Mary Baker, *Measuring Link Bandwidths Using a Deterministic Model of Packet Delay*, at Department of Computer Science at Stanford University, 13 pages.

Rowstron, Antony, and Peter Druschel, *Pastry: Scalable, distributed object location and routing for large-scale peer-to-peer systems*, at Microsoft Research, Ltd., St. George House and Rice University, 20 pages.

Druschel, Peter, and Antony Rowstron, *PAST: A large-scale, persistent peer-to-peer storage utility*, at Rice University and Microsoft Research, 6 pages.

Rowstron, Antony, and Peter Druschel, *Storage management and caching in PAST, a large-scale, persistent peer-to-peer storage utility*, at Microsoft Research, Ltd., St. George House and Rice University, 14 pages.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.lcs.mit.edu/chord.

Ellison, C., *SPKI Requirement*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

"At What Cost Pervasive? A Social Computing View of Mobile Computing Systems," IBM Research: vol. 38, No. 4, 1999, Pervasive Computing (28 pgs.).

"Connecting and Extending Peer-to-Peer Networks," Lion Share White Paper, dated Oct. 2004, 32 pages, http://lionshare.its.psu.edu/main/info/docspresentation/LionshareWP.pdf.

"Design Explorations," IBM Research: Social Computing Group (4 pgs.).

"IBM Lotus Instant Messaging and Web Conferencing," IBM Software—IBM Lotus Instant Messaging and Web Conferencing home page (3 pgs.).

"IBM Workplace Collaboration Services Overview Guide" dated Jan. 2005, 2 pages. (Printed from ftp://ftp.lotus.com/pub/lotusweb/IGM_Workplace_collaboration_services_g2247333301_118.pdf on Jul. 1, 2005).

"Presence and Awareness Services," Ramiro Liscano, Professor, Site, University of Ottawa, 89 pages, http://www.site.uottawa.ca/~rliscano/tutorials/PresenceAwarenessServices.pdf.

About Presentation Broadcasting, 3 pages printed Jul. 1, 2005 from http://office.microsoft.com/en-us/assistance/HP052411931033.aspx.

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

Boyer et al., "Virtual Social Clubs: Meeting Places for the Internet Community," IEEE International Conference on Multimedia Computing and Systems, pp. 297-301 (Florence, Italy, Jun. 7-11, 1999).

Castro et al., "Secure Routing For Structured Peer-to-Peer Overlay Networks," Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

Castro et al., "Topology-Aware Routing In Structured Peer-to-Peer Overlay Networks," Technical Report MSR-TR-2002-82, Microsoft Research, Microsoft Corporation, http://www.research.microsoft.com.

Cheng et al., "Hutchworld: Lessons Learned. A Collaborative Project: Fred Hutchinson Cancer Research Center & Microsoft Research," in Proceedings of Second International Conference on Virtual Worlds (VW 2000), pp. 1-2 (Paris, France, Jul. 5-7, 2000). http://research.microsoft.com/scg/papers/hutchvw2000.pdf.

Cheung, "Chatopus for Palm OS, Using IM Bots for Jabber," Chatopus-Palm OS Instant Messaging Client for XMPP/Jabber, Dated Oct. 20, 2002 (Last updated: Jun. 25, 2005), 6 pages, http://www.chatopus.com/articles/bots.html.

Cugola et al., "Peer to Peer for Collaborative Applications," in Proceedings of the 22nd International Conference on Distributed Computing Systems Workshops (ICDCS'02), pp. 359-364 (Vienna, Austria, Jul. 2-5, 2002).

Dorohonceanu et al., "A Desktop Design for Synchronous Collaboration," in Proceedings of the Graphics Interface '99 (GI'99), pp. 27-35 (Kingston, Ontario, Canada, Jun. 1999).

Duhr, "Oberflachenelemente in interaktiven und kooperativen anwendungen," Universitat Oldenburg, Department of Information Systems Thesis (Aug. 2000).

Ellison, C., et al., Simple Public Key Certificate, (Internet Draft 1999), at http://www.world.std.com/-cme/spki.txt (Aug. 6, 2001).

Famham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Garcia et al., "Extending a Collaborative Architecture to Support Emotional Awareness," EBAA '99—Workshop on Emotion-Based Agent Architectures, pp. 46-52 (May 2, 1999).

Greenberg et al, "Using a Room Metaphor to Ease Transitions in Groupware," University of Calgary, Department of Computer Science, Research Report 98/611/02, 31 pages (1998).

Greenberg, "Collaborative Interfaces for the Web," in Human Factors and Web Development, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages (Dec. 1997).

Handley et al., "SIP: Session Initiation Protocol," Network Working Group, Request for Comments 2543, pp. 1-153 (Mar. 1999).

Kindberg, "Mushroom: A Framework for Collaboration and Interaction Acros the Internet," in Proceedings of the Fifth ERCIM Workshop on CSCW and the Web (St. Augustin, Germany, Feb. 1996).

Kollock et al., "Managing the Virtual Commons: Cooperation and Conflict in Computer Communities," in Computer-Mediated Communication: Linguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

Kollock, "The Economies of Online Cooperationi Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Lee et al., "Supporting Multi-User, Multi-Applet Workspaces in CBE," in Proceedings of the ACM 1996 Conference on Computer Supported Cooperative Work, pp. 344-353 (Cambridge, MA, 1996.

MeetingMaker—Meeting Maker printout, 2 pages printed on Jul. 1, 2005 from http://www.meetingmaker.com/products/meetingmaker/default.cfm.

MeetingMaker—WebEvent Publish printout, 2 pages printed on Jul. 1, 2005 from http://www.meetingmaker.com/products/webevent_publish/default.cfm.

QuickTime Broadcaster (3 pages) printed Jul. 1, 2005 from http://www.apple.com/quicktime/broadcaster/.

Schmidt et al., "A Generic System for Web-Based Group Interaction," In Proceedings of the Thirty-First Hawaii International Conference on System Sciences, vol. I, pp. 545-554 (Kohala Coast, HI, Jan. 6-9, 1998).

SlidesNow! (3 pages) printed Jul. 1, 2005 from http://www.slidesnow.com/about.shtml.

Smith et al., "The Social Life of Small Graphical Chat Spaces," in Proceedings of the SIGCHI Conference on Human Factors in Computing Systems, pp. 462-469 (The Hague, Netherlands, Mar. 2000) http://research.microsoft.com/scg/papers/vchatchi2000.pdf.

Smith et al., "What Do People Do in Virtual Worlds? An Analysis of V-Chat Log File Data," Microsoft Corporation Report (Apr. 1, 1998) http://research.microsoft.com/scg/papers/kollockvpchat.pdf.

The Best Way to Centrally Deploy Applications and Provide On-Demand Access, 2 pages printed Jul. 1, 2005 from http://www.citrix.com/English/ps2/products/product.asp? contentID=186.

Zhao, et al., "A Web Based Multi-Display Presentation System," 2 pages printed Jul. 1, 2005 from http://www.fxpal.com/publications/FXPAL-PR-04-303.pdf.

"*METEOR-S Web Service Discovery Infrastructure*," A Component of the METEOR-S System on Semantic Web Services and Processes; METEOR-S Web Service Discovery Infrastructure (MWSDI); dated Dec. 14, 2005, 2 pages; http://lsdis.cs.uga.edu/proj/meteor/mwsdi.html.

"Microsoft Computer Dictionary," Fifth Edition, Microsoft Press, 2002p pp. 31, 238-239, 424, 467.

"Microsoft, Groove Networks to Combine Forces to Create Anytime, Anywhere Collaboration," Microsoft Presspass-Information for Journalists, retrieved from http://www.microsoft.com/prespass/features/2005/mar05/03-10GrooveQA.asp on May 31, 2005 (9 pages).

"*Microsoft Overhauls Longhorn Drivers for Usability, Connectivity*," eWeek.com Enterprise News & Reviews, dated Dec. 14, 2005, 5 pages; http://www.eweek.com/article2/0,1759,1654462,00.asp.

"News: Sun Incorporating JXTA into Products," java.net The Source for Java Technology Collaboration, Jan. 30, 2004, retrieved from http://today.java.net.pub/n/Sun/KXTA on Jun. 2, 2005 (1 page).

"Products: Groove Virtual Office FAX," Groove Networks, retrieved from http://www.groove.net/index.cfm?pagename=VO_FAX on May 31, 2005 (5 pages).

"Products: Groove Virtual Office," Groove Networks, retrieved from http://www.groove.net/index.cfm/pagename/VirtualOFfice on May 31, 2005 (2 pages).

"Products: Why Grove," Groove Networks, retrieved from http://www.grove.net/index.cfm?pagename=Products_Overview on May 31, 2005 (2 pages).

"Project JXTA: An Open, Innovative Collaboration," Sun Microsystems, Inc. Apr. 25, 2001, (pp. 1-5).

"Project JXTA: Technical Shell Overview," Sun Microsystems, Inc. Apr. 25, 2001; retrieved from http://www.jxta.org/project/www.docs/TechShellOverview.pdf on Aug. 10, 2006.

"Project JXTA: Technical Specification," Version 1.0, Sun Microsystems, Inc., Aug. 25, 2001; retrieved from http://download.jxta.org/files/documents/27/12/JXTA-Spec.pdf on Aug. 10, 2006.

Reynolds, J., "BOOTP Vendor Information Extensions," Network Working Group, http://www.faqs.org/rfc/rfc1395.txt, retrieved Dec. 23, 2005, Jan. 1993.

Adamic, L., "P2P Search that Scales," pre-presentation description for talk on Nov. 7, 2001, http://conferences.oreillynet.com/cs/p2web2001/view.

Balachander et al., "Early Measurements of a Cluster-Based Architecture for P2P Systems", IMW '01, ACM, pp. 105-109 (2001).

Beatty et al., "*Web Services Dynamic Discovery (WS-Discover)*," Microsoft Corporation, dated Apr. 2005, 42 pages; http://msdn.microsoft.com/library/en-us/dnglobspec/html/WS-Discovery.pdf.

Bolcer et al., "Peer-to-Peer Architectures and the Magi™ Open-Source Infrastructure," Endeavors Technology, Inc., Dec. 6, 2000.

Clark et al., "Freenet: A Distributed Anonymous Information Storage and Retrieval System", H. Federrath (Ed.), Anonymity 2000, LNCS 2009, pp. 46-66 (2001).

European Search Report; EP 02 00 5770; Munich; Aug. 9, 2005.

Gagnes et al., "*Discovering Semantic Web Services In Dynamic Environments*," Norwegian Defence Research Establishment (FFI), University of Oslo, Department of Informatics, Oslo, Norway, 4 pages; http://wscc.info/p51561/files/paper61.pdf.

Gong, Li. "Project JXTA: A Technology Overview," Sun Microsystems, Inc., Apr. 25, 2001; retrieved from http://download.jxta.org/files/documents/27/35/JXTA-Tech-Overview.pdf on Aug. 10, 2006.

Hong et al., "Dynamic Group Support in LANMAR Routing Ad Hoc Networks," IEEE, pp. 304-308 (2002).

Hoschek, Wolfgang, "A Unified Peer-to-Peer Database Framework for Scalable Service and Resource Discovery", M. Parasher (Ed.), GRIG 2002, LNCS 2536, pp. 126-144 (2002).

Huitema, C., Distributed Peer-to-Peer Name Resolution, Presentation Slides from the O'Reilly Peer-to-Peer and Web Services Conference, Nov. 5, 2001.

Joa-Ng, M. et al., "A GPS-based Peer-to-Peer Hierarchical Link State Routing for Mobile Ad Hoc Networks", IEEE 51$^{st}$ Vehicular Technology Conference Proceedings, vol. 3, pp. 1752-1756 (2000).

Joa-Ng, M. et al., "A Peer-to-Peer Zone-Based Two-Level Link State Routing for Mobile Ad Hoc Networks", IEEE Journal on Selected Areas in Communications, vol. 17, No. 8, pp. 1415-1425 (Aug. 1999).

Kwon et al., "An Efficient Peer-to-Peer File Sharing Exploiting Hierarchy and Asymmetry", IEEE, pp. 226-233 (2003).

Labovitz et al., "Internet Routing Instability", SIGCOMM '97, ACM, pp. 115-126 (1997).

Legedza et al., "Using Network-level Support to Improve Cache Routing", Hamilton et al., (Ed.), Computer Networks and ISDN Systems: The International Journal of Computer and Telecommunications Networking, vol. 30, No. 22-23, pp. 2193-2201 (1998).

Microsoft Corporation; "Introduction to Windows Peer-to-Peer Networking," Published: Jan. 2003.

Microsoft.com, "Peer-to-Peer Common Documentation," http://msdn.microsoft.com/library/default.asp?url=/library/en-us/p2psdk/p2p/peer_to_common_documentation.asp, (last visited Aug. 5, 2005).

Morris, J.; Data Structures and Algorithms—Section 8.3; Online Publication 1998; http://clips.ee.uwa.edu.au/{morris/Year2/PLDS210/hash_tables.html.>: Aug. 8, 2005.

Newmarch, J., "JXTA Overview," Oct. 7, 2002, retrieved from http://jan.netcomp.monash.edu.au/distjava/jxta.html on Jun. 2, 2005 (pp. 1-15).

Oram, A.,; Peer -to-Peer: Harnessing the Benefitss of a Disruptive Technology Passage; Peer-to-Peer: Harnessing the Benefits of a Disruptive Technology; Mar. 15, 2001; pp. 94-122.

Partial European Search Report; EP 02 00 5770; Mar. 27, 2005.

Portmann et al., "The Cost of Peer Discovery and Searching in the Gnutella Peer-to-peer File Sharing Protocol", Proceedings Ninth IEEE International Conference on Networks, pp. 263-268 (2001).

Portmann, M., et al., "The Cost of Application-level Broadcast in a Fully Decentralized Peer-to-peer Network", Proceedings ISCC 2002 Seventh International Symposium, pp. 941-946 (2002).

Ratnasamy et al., "A Scalable Content-Addressable Network", SIGCOMM '01, ACM, pp. 161-172 (2001).

Saroiu et al., "A Measurement Study of Peer-to-Peer File Sharing Systems", Technical Report #UW-CSE-01-06-02, Department of Computer Science & Engineering, University of Washington, Seattle, Washington, 14 pages (2001).

Sedgewick, R.; Algorithms in C—Third Edition—Part of Chapter XVI; Algorithms in C—Third Edition, 1998; pp. 662-691.

Sedgewick, R.; Algorithms in C—Third Edition—Chapter XIV; Algorithms in C++; 1998; pp. 573-608; Section 14.4.

Stoica et al., A Scalable Peer-to-Peer Lookup Service for Internet Applications; MIT Technical Report; Mar. 23, 2001; http://www.lcs.mit.edu/publications/pubs/ps/MIT-LCS-TR-819.ps>.

Sunaga et al., "Advanced Peer-to-Peer Network Platform for Various Services-SIONet (Semantic Information Oriented Network)", Proceedings of the Second International Conference on Peer-to-Peer Computing, IEEE, pp. 169-170 (2002).

Tanenbaum, Andrew S., "Computer Networks," Third Edition, Prentice Hall PTR, 1996; pp. 437-449.

Traversat et al., "Project JXTA Virtual Network," Sun Microsystems, Inc. Oct. 28, 2002 (pp. 1-10).

Xiao et al., "On Reliable and Scalable Peer-to-Peer Web Document Sharing", Proceedings of the International Parallel and Distributed Processing Symposium, IEEE, pp. 23-30 (2002).

Zhang et al., "gMeasure: A Group-based Network Performance Measurement Service for Peer-to-Peer Applications", IEEE Globecom 2002, 5 pgs (2002).

Zhao et al., "Tapestry: An Infrastructure for Fault-tolerant Wide-area Location and Routing", Report No. UCB/CSD-01-1141, Computer Science Division (EECS), University of California, Berkeley, California, 27 pgs (2001).

\* cited by examiner

| | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 0 | Version ||||||||||||||| | Type |||||||||||||||
| 4 | Neighbor ID |||||||||||||||||||||||||||||||
| 8 | Signature |||||||||||||||||||||||||||||||
| 12 | Total Size ||||||||||||||| | Reserved |||||||||||||||
| 16 | Port ||||||||||||||| | Connect Flags |||||||||||||||
| 20 | Peer Address Binary Container |||||||||||||||||||||||||||||||
| XX | Peer name Information Binary Container |||||||||||||||||||||||||||||||

| | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 0 | Version ||||||||||||||| | Type |||||||||||||||
| 4 | Neighbor ID |||||||||||||||||||||||||||||||
| 8 | Signature |||||||||||||||||||||||||||||||
| 12 | Total Size ||||||||||||||| | Reserved |||||||||||||||
| 16 | Error Code |||||||||||||||||||||||||||||||
| 20 | Neighbor Count |||||||||||||||||||||||||||||||

| | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 0 | Version ||||||||||||||| | Type |||||||||||||||
| 4 | Neighbor ID |||||||||||||||||||||||||||||||
| 8 | Signature |||||||||||||||||||||||||||||||
| 12 | Total Size ||||||||||||||| | Reserved |||||||||||||||
| 16 | My Neighbor ID |||||||||||||||||||||||||||||||
| 20 | Peer User Name Information |||||||||||||||||||||||||||||||

372

| byte | 0 | 1 | 2 | 3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| 0 | Version | | Type | |
| 4 | Neighbor ID | | | |
| 8 | Signature | | | |
| 12 | Total Size | | Reserved | |
| 16 | Alternative Protocol | | Alternative Port | |
| 20 | Peer Node Address | | | |

PEER-TO-PEER GROUP MANAGEMENT AND METHOD FOR MAINTAINING PEER-TO-PEER GRAPHS

FIELD OF THE INVENTION

The present invention relates generally to group management in a peer-to-peer infrastructure, and more particularly to group formation, maintenance, and data replication methods for groups formed via peer-to-peer protocols.

BACKGROUND OF THE INVENTION

Group communication technologies on the Internet allow users with common interest to collaborate, share files, chat with one another, multi-cast audio and video for presentations and group meetings, and engage in multi-player gaming. Indeed, the ability for group formation in an ad hoc basis present significant advantages to allow users with common interests to gather in a virtual area or group that may be segregated from the general Internet population thereby facilitating useful discussion in collaboration between such like minded individuals. Currently, however, most group communication and formation takes place in a server centric environment whereby all communication flows to or through large central servers to which individuals may connect to join and participate in the group.

With the reemergence of peer-to-peer technology, the current server centric model of Internet communication is quickly being replaced. Indeed, peer-to-peer technologies enable users to contact one another in a serverless environment, free from the constraints of server based Internet communication. In a peer-to-peer based system, a users anomity and privacy may be maintained since communication occurs directly between peers within the network. However, while individual communication and file sharing is relatively well established in peer-to-peer networks, establishing, discovering, joining, maintaining, and sharing information in a group peer-to-peer environment is not well established. However, individuals have grown accustomed to the benefits provided by such grouping technology in the server centric environment. Therefore, a need exists for technology that allows both the benefits of peer-to-peer technologies and grouping technologies to be realized in the serverless environment that is peer-to-peer.

As with a server centric environment, groups may be entirely open to allow Internet file searching and sharing within groups. Network location based groups that are typically groups of computers sharing the same access point in a conference room or groups of computers behind a firewall are another type of group known in the server centric world. Additionally, password defined groups allowing for private communication/collaboration within the group, such as secure conference room groups, in home networking groups are also known. External groups, such as NT domain based groups and groups of passport users also exists. Finally, voting based groups that are engoverned by peer reputation based systems where peers are voted in and out are also known. Therefore, the existence of similar groups within the peer-to-peer serverless environment are also desired.

However, because peer-to-peer networks are formed as a graph of distributed users or peers, it is necessary that group communication be passed to one peer to another before all peers within a network may become cognizant of the shared information. Systems that provide such routing include Usenet and OSPF. However, such current systems suffer from limitations that have, to date, limited the full development of group peer-to-peer technology. Additionally, peer-to-peer networks currently suffer from a lack of adequate graph management that, at times allows the graphs to "break" or become split when one of the members leaves the group. In such an instance, information from one half of the group may no longer be passed to peer members on the other side of the partition created by the departure of one of the peers. As a further disadvantage, no adequate mechanism exists for the detection of such partition.

There exists, therefore, a need in the art for a peer-to-peer security framework that addresses the above-described threats at a group level that can adversely affect the peer-to-peer group.

BRIEF SUMMARY OF THE INVENTION

The system and method of the present invention presents a new and improved peer-to-peer group protocol that provides the enabling technology for group formation and communication in a peer-to-peer environment. Aspects of the present invention include the formation of a peer-to-peer group, including the generation of a group identity, the discovery of groups created in the peer-to-peer environment, and method for joining and leaving a peer-to-peer group in a systematic and friendly fashion that ensures graph connectability. A peer-to-peer group flooding protocol in accordance with the teachings of the present invention ensures timely and useful communication of shared group information within the peer-to-peer network. Active graph maintenance for the peer-to-peer group is also disclosed whereby a level of redundancy is maintained to ensure connectability within the graph. Additionally, the active graph management seeks to optimize the usefulness of the neighboring relationships formed within the peer-to-peer group through the development and maintenance of a utility index assessing the usefulness of information provided by neighbors and their speed of responsiveness. Additionally, the graph management of the present invention provides a mechanism to detect partitions within the graph of a peer-to-peer group through the use of a group signature. Such detection of a partition within the peer-to-peer group graph allows the system of the present invention to recover and rejoin the partitioned segments of the peer-to-peer group to maintain the group communication. This graph management also ensures that such partitions or holes within a peer-to-peer graph are avoided when one of the peers within the group decides to leave. This is accomplished in accordance with one aspect of the present invention by providing a list of other neighbors to the peers with whom the leaving peer is in communication so that they may remain within the peer-to-peer group upon the leaving nodes departure.

In an exemplary embodiment of the present invention, a peer-to-peer chat environment and user interface is presented that utilizes the systems and methods of the present invention. Specifically, new group formation, group discovery, group membership application, and communication within a group are all provided in a serverless chat environment.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 6 is a simplified data structure diagram illustrating a connect message constructed in accordance with an aspect of the present invention;

FIG. 7 is a simplified data structure diagram illustrating a refuse message constructed in accordance with an aspect of the present invention;

FIG. 8 is a simplified data structure diagram illustrating a welcome message constructed in accordance with an aspect of the present invention;

Figure 1:
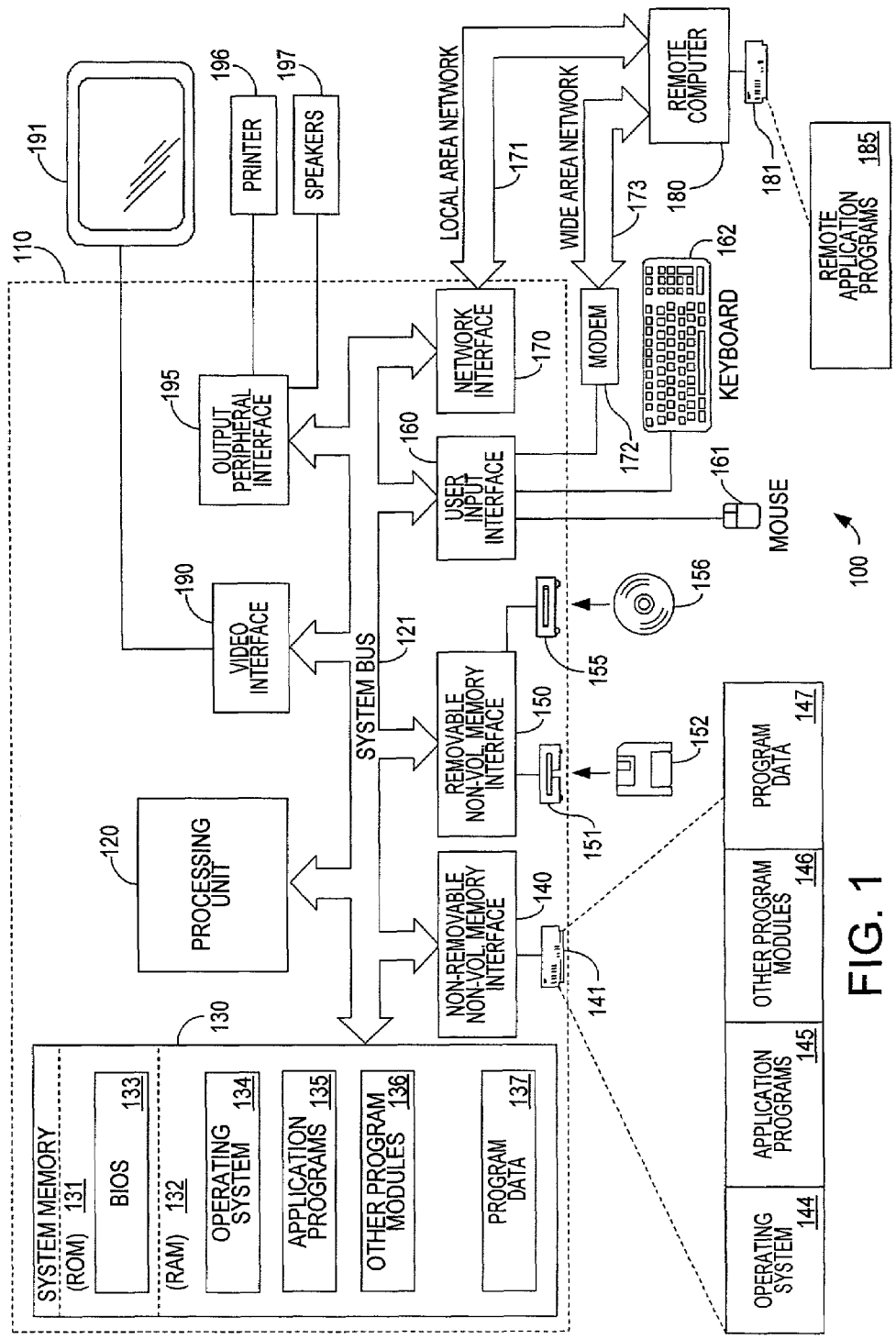
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data.

However, while the invention is being described in the foregoing context, it is not meant to be limiting as those of skill in the art will appreciate that various of the acts and operation described hereinafter may also be implemented in hardware. As introduced above, the success of a peer-to-peer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the methods of the instant invention find particular applicability is described in co-pending application Ser. No. 09/942,164, entitled Peer-To-Peer Name Resolution Protocol (PNRP) And Multilevel Cache For Use Therewith, filed on Aug. 29, 2001, and in co-pending application Ser. No. 09/955,924, entitled Peer-To-Peer Name Resolution Protocol (PNRP) Group Security Infrastructure And Method, filed on even date herewith, the teachings and disclosure of which are hereby incorporated in their entireties by reference thereto. However, one skilled in the art will recognize from the following teachings that the methods of the present invention are not limited to the particular peer-to-peer protocol of these co-pending applications, but may be applied to other protocols with equal force. Likewise, co-pending application Ser. No. 09/956,260, entitled Peer-To-Peer Name Resolution Protocol (PNRP) Security Infrastructure And Method, filed on even date herewith, describes an underlying security infrastructure that ensures that the identities of the various entities within the network are valid, without unnecessary burdening the network with excess traffic. The teachings and disclosure of this application are also incorporated in their entireties by reference thereto.

As discussed in the above-incorporated co-pending application describing the PNRP and to provide some useful background, establishing peering relations between individual peers is an expensive process in existing peer-to-peer networks. In the PNRP, however, each node accumulates a routing table that contains a list of references to other nodes in the network. For each node entry, address information, which may include a node identification, address, the key of the node, and the distance between the key of this node and the key of the local node are obtained. Each time the local node learns about a remote node, it checks whether the node is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been breached yet.

For communication between individual peers in PNRP, when a node receives a query it searches for the entry in its routing table whose key best matches the target, excluding the nodes that have already been visited. The query is then forwarded directly to the node that advertised the entry. If there is no adequate entry, the request is sent back to the node from which the request was received; this node will try another entry in its own routing table. The request is successful if it reaches the entry whose key matches the target. It is unsuccessful if the target is not reached in the maximum number of steps, or if the node from which the request was received tries all possible neighbors and receives a negative response. In the case of successful requests, the response is relayed by all intermediate hops. It carries the address of the node that held the target key, and this entry can be inserted in the routing tables of the intermediate nodes.

As with many successful P2P protocols, entities (both individual peers as well as groups) can be published for easy discovery. In this group context and as discussed above, groups are collections of peers with a mutual agreement to distribute one or more types of information. Groups are characterized by a group friendly name ($NAME_G$) and a group or category identification ($CID_G$). In general, group discovery can be divided into three categories. The first relates to the discovery of a private group, that is a peer is given $CID_G$. The second category relates to the discovery of a public group. Typically, a peer knows a group name for which to search. The third category relates to the enumeration of a group hierarchy, i.e., a peer wants to browse a list of groups. Preferably, the discovery within the first two categories uses PNRP. However, group-based mechanisms should be used for the third as will be described below.

As discussed in the above referenced co-pending applications, PNRP uses peer ID's to uniquely identify peers. Group or category ID's may be coupled with these peer ID's to uniquely identify an instance of a category or group. However, category ID's themselves are not necessarily unique. Therefore, they should only be used as a PNRP category ID, not a peer ID. Multiple members of the group may register in that category to make discovery easier. Indeed, it may be useful to have a non-unique category ID based on a friendly name. $NAME_G$ may then be transformed to a category ID ($CID_{NAME}$) by performing a hash of the group friendly name with the seed "GROUP". The seed helps reduce collisions with other types of registered categories with the same name, but different type.

As a preface to the discussion of the actual method of discovering the various types of groups through PNRP, it is instructive to note that each peer X is has peer ID ($ID_{Px}$). For the discovery process there are five utility peer IDs. These IDs may be used by actual peers, but are the basis of many important calculations to be discussed below. The first utility peer ID is $ID_{MIN}$, which represents the lowest possible peer ID. Next is $ID_{MAX}$, which represents the highest possible peer ID. $ID_{MID}$ is a utility peer ID based on the calculation ($ID_{MIN}$+$ID_{MAX}$)/2. $ID_{HMID}$ is calculated as ($ID_{MID}$+$ID_{MAX}$)/2, and $ID_{LMID}$ is calculated as ($ID_{MIN}$+$ID_{MID}$)/2. As discussed in the above identified co-pending application describing the base PNRP, the number space is circular. Therefore, it is hard to assess a "lowest possible peer" in the abstract. However, within a group the fixed prefix makes the number space sequential. The Category IDs are concatenated to the peer IDs to generate a categorized peer ID (CID:ID). Now, both peer IDs and categorized peer IDs may be registered with PNRP, and searched for through PNRP.

While PNRP may be used to discover all types of groups, private groups are not intended to be easily discoverable. Therefore, those invited to join the group must know $CID_G$ to join. If the group has group contacts, each contact Cx registers $CID_G$:$ID_{Cx}$ with PNRP. If the group does not use contacts, then each group member Px registers $CID_G$:$ID_{Px}$ with PNRP. In an alternate embodiment of the present invention, the group members register an ID:Publisher pair. In this embodiment, the ID portion may be a category or a peer ID, and the "Publisher portion may include a network endpoint address, including and IP address, port, and protocol. This ID:Publisher pair may be collectively referred to as a published peer ID. The quantity that the individual peer would register with PNRP as group members in this embodiment is CIDG:Publisher, where Publisher is the network address, port, and protocol of the peer's group service responsible for interacting with the specified group. This will be unique for each peer at any point in time. For the sake of brevity, however, this application will use the term "CID:ID" generically to refer to either of these embodiments.

Figure 2:
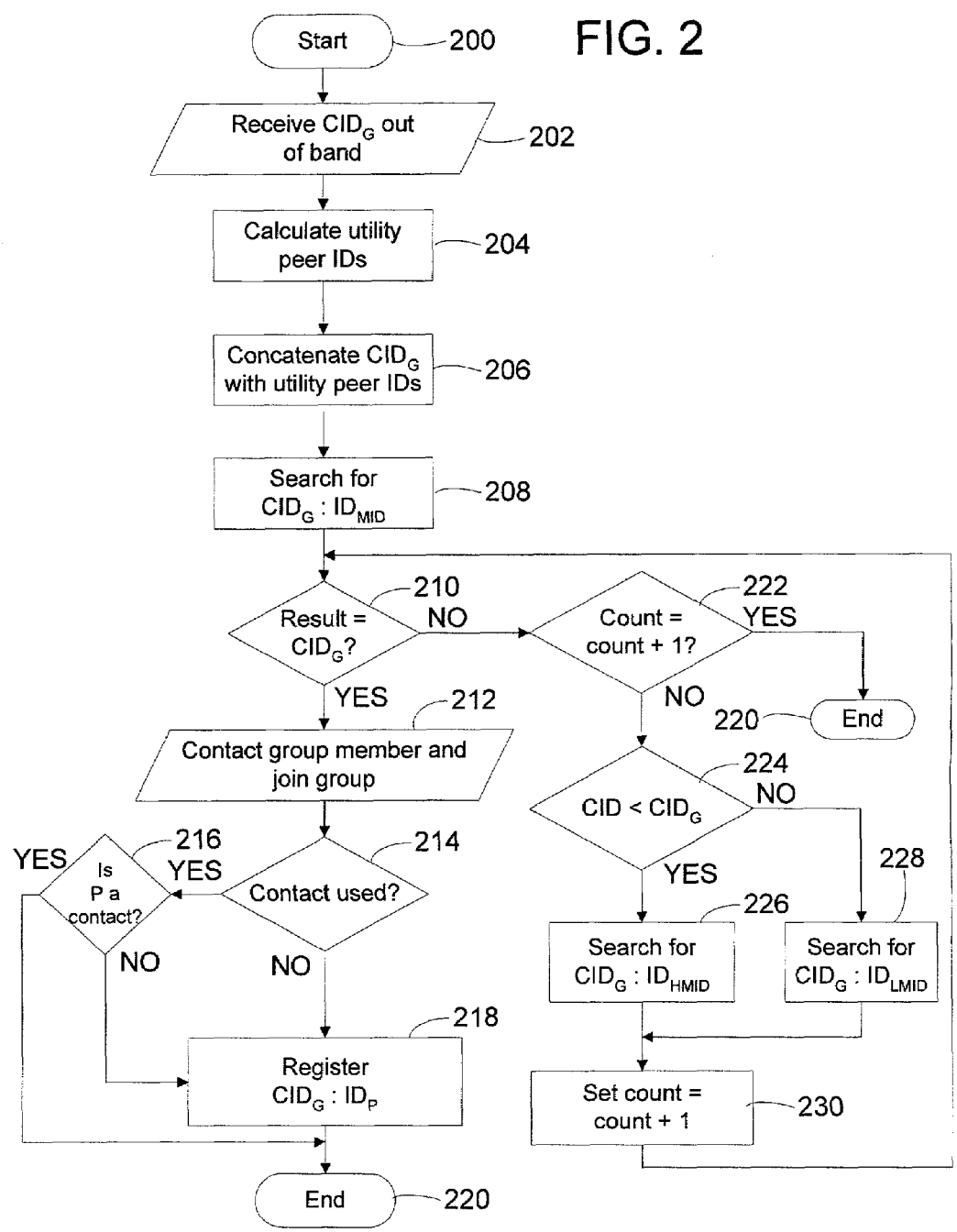
FIG. 2 is a simplified flow diagrammatic illustration of a peer-to-peer private group discovery process in accordance with an embodiment of the present invention.

Once the proper registration has been accomplished, the private group discovery follows the procedure illustrated in simplified flow diagrammatic form in FIG. 2. Once the process begins 200, a potential member P learns $CID_G$ out of band (via email, IM, etc.) 202. The utility peer IDs are calculated 204, as are the concatenated $CID_G$:IDs 206. P then searches 208 for the concatenated $CID_G$:$ID_{MID}$ using PNRP. If 210 the result is NOT for the category $CID_G$, then the search proceeds based on the actual result. That is, if 224 the return result is for a category ID less than $CID_G$, a search for $CID_G$:$ID_{HMID}$ is performed 226. Otherwise, a search for $CID_G$:$ID_{LMID}$ is performed 228. This is a second search as indicated in FIG. 2 by the setting of a count to count +1 at step 230 (assuming that the count starts at 0). If at step 210, however, the CID of the second search result is still not $CID_G$ (as determined by step 222), the group discovery fails and the process ends 220.

If at step 210 the discovery is successful, the potential member P contacts the group member described in the search result and joins the group 212. The process for securely joining a group is described in the above identified co-pending application entitled Peer-To-Peer Name Resolution Protocol (PNRP) Group Security Infrastructure And Method. If 214 the group does not use contacts, or if 216 the group uses contacts and P is to be a contact, P registers $CID_G$:$ID_P$ with PNRP 218. The discovery process then ends 220. Ideally a search for $CID_G$:$ID_{MID}$ will find a member of the desired group. The second search is added, however, to improve robustness for non-ideal PNRP networks.

Public groups may be discovered through the same mechanism as private groups just discussed. Unlike the discovery of private groups, however, public groups may also be discovered by the publication of a category ID derived from a friendly name. Preferably, public groups should designate a subset of their members as contacts. This subset need not be proper, but ideally will be a small fixed number, such as, e.g., 4. Friendly-name derivatives are differentiated from each other solely by their friendly name. Consequently, group friendly-names should be as unique as possible. However, it is possible for a large number of groups to register using the same friendly name. In such a case, a category enumeration search is needed to find the 'right' group. For each enumerated category, a priori knowledge of desired group properties helps the peer determine whether it is the 'right' group. Since a group may register more than one friendly-name, a good strategy for a group is to register two names: one hierarchical, and one simple. For example, if the group is groups.games.CFS2, it may register derivatives of both groups.games.CFS2 and CFS as group IDs.

Figure 3:
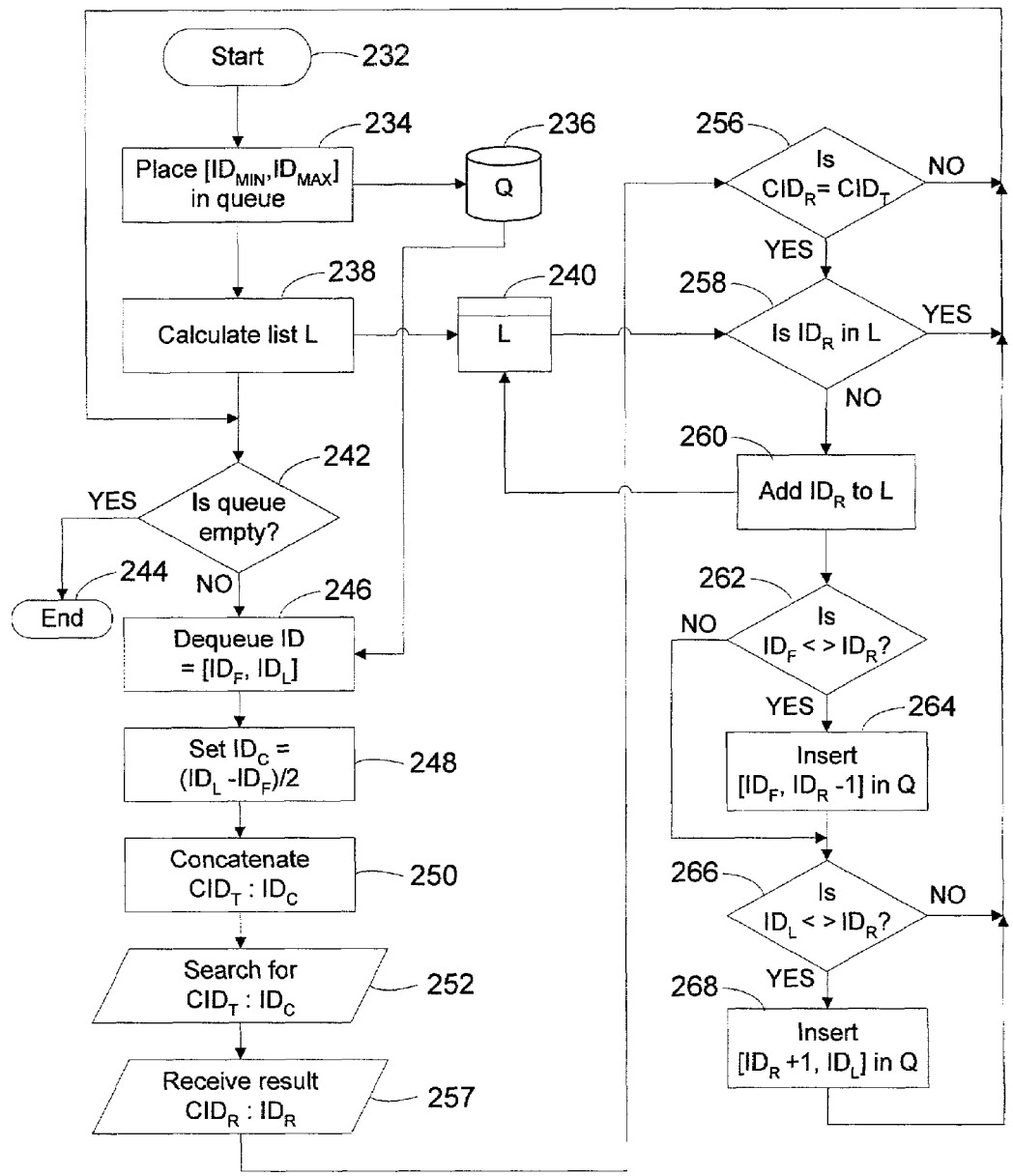
FIG. 3 is a simplified flow diagrammatic illustration of a group category enumeration procedure in accordance with an embodiment of the present invention.

Category enumeration search allows a peer to enumerate all discoverable instances CID:ID pairs with a particular CID. This is useful for public group discovery, as mentioned above, but is inefficient. The procedure for enumerating $CID_T$ is illustrated in simplified flow diagrammatic form in FIG. 3. To start 232, the peer places 234 the pair [$ID_{MIN}$, $ID_{MAX}$] in a FIFO queue Q 236. It then creates 238 an empty list L 240 of IDs. If 242 the Q is empty, the process ends 244. However, if Q 236 is not empty, the peer dequeues 246 an ID from the front of Q 236, with ID=[$ID_F$, $ID_L$]. The peer then sets 248 $ID_C$=($ID_L$-$ID_F$) 2, concatenates $CID_T$:$ID_C$ 250, and searches 252 for $CID_T$:$ID_C$, which returns 254 $CID_R$:$ID_R$. If 256 $CID_R$ is not equal to $CID_T$, or if 258 $ID_R$ is in L 240, the process determines 242 if any more entries exist in Q 236. If 256 $CID_R$ is equal to $CID_T$, or if 258 $ID_R$ is not in L 240, then the peer adds 260 $ID_R$ to list L 240. If 262 $ID_F$<>$ID_R$, the peer inserts 264 [$ID_F$, $ID_R$-1] in Q 236, and if 266 $ID_L$<>$ID_R$, the peer inserts 268 [$ID_R$+1, $ID_L$] in Q 236. The process is then repeated until Q 236 is empty 242, at which point the process ends 244. This algorithm assumes that the closest match is always returned by a PNRP search request. It requires 2N requests to complete, where N is the number of registered instances of $CID_T$.

With respect to group enumeration, each group contains, at a minimum, one record per group contact/participant listing a peer ID and IP address, and one record containing basic group information including group name, group ID, and optional information such as group friendly name. Each contact, participant, and channel information record has a flag indicating whether the record belongs to this group, a 'parent' group, or a 'child' group.

As this indicates, groups may establish parent-child relationships with other groups to create hierarchies. Establishing a parent-child relationship requires that both the parent and child groups agree to the relationship (as represented by group owners or representatives), and that one or more participants in the child group maintain their group record and their own participant/contact record in the parent's group. Further, one or more participants in the parent group must maintain their group record and their own participant/contact record in the child's group. The second and third requirement necessitates that publishing peers be members of a parent or child group, in addition to their own. Group hierarchies allow groups to organize themselves, solely to simplify group discovery and enumeration. The strategy described below facilitates enumeration of groups. It is a compromise between efficiency of maintenance and efficiency of enumeration.

Figure 4:
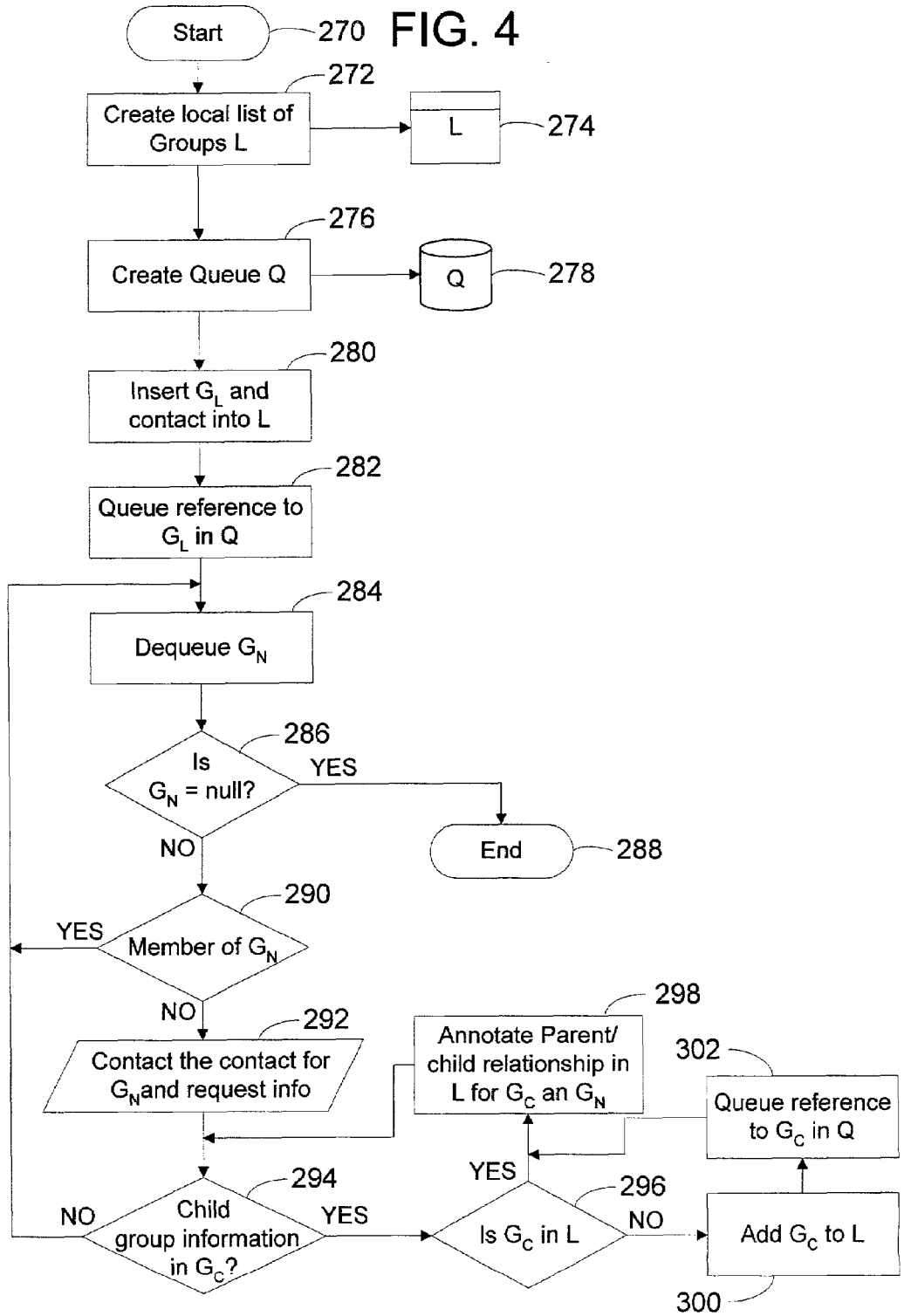
FIG. 4 is a simplified flow diagrammatic illustration of a group decendent enumeration procedure in accordance with an embodiment of the present invention.

With respect to enumerating immediate relatives, peers already have access to immediate parent and child group contact information in their own group database. They can enumerate immediate parents and children by walking their local database. For enumerating all descendants, however, the process illustrated in simplified flow diagrammatic form in FIG. 4 is followed. To start 270, the peer creates 272 L 274, which is a local empty list of groups. For each group added to L 274, L 274 will contain the group's parent/child relationship, group information record, and at least one contact for the group. The peer then creates 276 Q 278, which is an empty LIFO queue of groups to investigate. Q 278 contains references into L 274, to avoid duplicating information. The peer inserts 280 the local group $G_L$ and a contact for $G_L$ into L 274. It then queues 282 a reference to $G_L$ in Q 278. Once this has been performed, it dequeues 284 the group reference $G_N$ from Q 278. If 286 $G_N$ is NULL, then the process ends 288. However, if 290 the peer is not already a member of $G_N$, it contacts 292 the known contact for $G_N$ and requests a collection of all group attribute and contact information for the group. This is a special operation that does not require a formal JOIN and SYNCHRONIZE. For each unique child group information record $G_C$ in $G_N$ 294, if 296 $G_C$ is in L 274, the peer annotates 298 the parent/child relationship in L 274 for both $G_C$ and $G_N$. If 296, however, $G_C$ is not in L 274, the peer adds 300 $G_C$ and a $G_C$ contact record to L 274 and queues 302 a reference to $G_C$ in Q 278. The peer annotates 298 the parent/child relationship in L 274 for both $G_C$ and $G_N$. The process then repeats by dequeuing 284 the next group reference $G_N$ from Q 278 until $G_N$ is NULL 286, at which point the process ends 288. Enumerating all parents is identical to enumerating all descendants, except with 'parent' instead of 'child' records. Enumerating the full hierarchy is analogous, except both parents and children in every group are processed.

Figure 5:
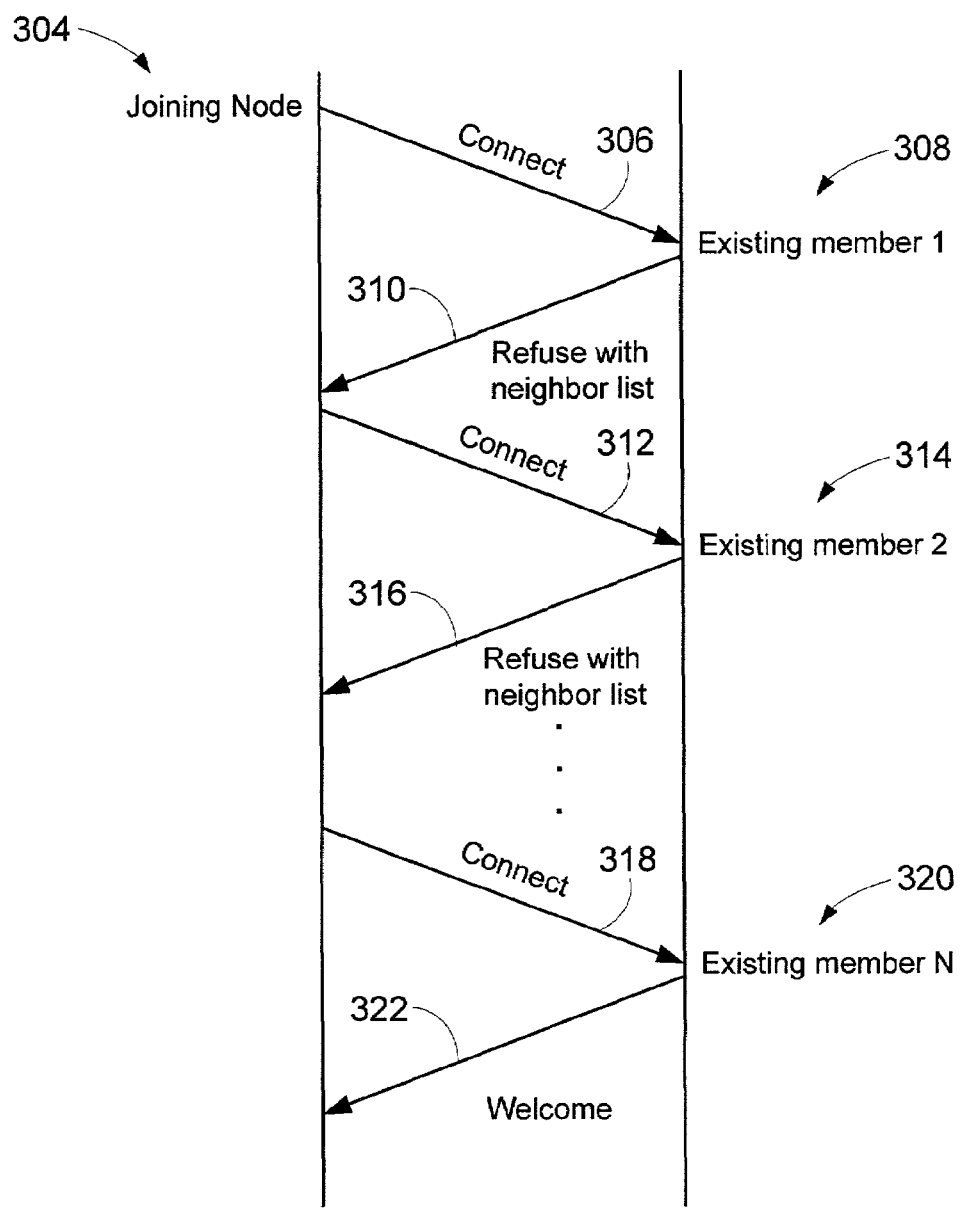
FIG. 5 is a simplified flow diagrammatic illustration of a group connect procedure in accordance with an embodiment of the present invention.

Once the proper group is found through the mechanisms just discussed, the process of securely joining the group starts as discussed at length in the above identified co-pending application entitled Peer-To-Peer Name Resolution Protocol (PNRP) Group Security Infrastructure And Method. FIG. 5 illustrates this connect process in a simplified communications waterfall diagram. As may be seen, the joining node 304 first attempts to contact 306 a known existing group member 308 with a connect message. An exemplary connect message 324 is illustrated in FIG. 6. If, for any reason this existing member 308 is unable to admit the joining node 304 (e.g., node lacks authority to accept new members), the existing member 308 returns 310 a refuse message along with a neighbor list of other group members about which the existing member 308 knows. An example of such a refuse message 326 is illustrated in FIG. 7. The connect process is repeatedly attempted (illustrated at 312, 314, 316 . . . ) until the joining node 304 connects 318 to an existing member 320 who is able to admit him to the group. At such a point the existing member returns 322 a welcome message to the joining node admitting him to the group. FIG. 8 illustrates an exemplary welcome message 328.

Once in the group, the new member (designated 304 in FIG. 5) needs to learn of the group information. Indeed, in many "cloud" applications there is a need replicate a set of objects in all the nodes of the system. This is commonly realized with flooding protocols that manage to simply and robustly distribute copies of messages to all the members of the group. Variations of flooding protocols can also be used to manage a broadcast service, in which user can post one message and be sure that it is received by all members of the group.

Underlying the flooding protocol of the present invention are some basic assumptions about the peer-to-peer group system. First, it is assumed that the "cloud" is composed of a variable number of stations (nodes), that each station has a unique identifier, and that stations continuously leave and join the cloud. Further, it is assumed that stations that are a member of the cloud get connected to a small number of neighbors with whom they can exchange messages, and that no station needs to have a complete view of the cloud. Assuming that the objects that are to be replicated are small enough to fit into simple messages, it can also be assumed that each host has a database containing copies of objects.

The goal of the flooding protocol is to make sure that each node gets a copy of all the objects, that the copy will be updated simultaneously on all nodes, and that if needed the copy will be deleted, simultaneously on all nodes. There have been many instantiations of such protocols, the common examples being the Usenet news (NNTP) and the OSPF flooding protocol. In an embodiment of the present invention, each object that has to be flooded is identified by a unique identifier (UID), each copy is identified by a monotonically increasing version number or sequence number (SNUM), and in addition to the version number, each copy may be further qualified by an age or a status (AGE) in order to allow for synchronized removal. Preferably, this age is encoded as a parameter that is monotonically increasing, from new to obsolete.

The flooding protocol has two phases, a join phase during which newly connected neighbors merge their databases, and a run phase during which the already connected neighbors receive and synchronize updates. When two neighbors get connected, they each have versions of the database that have evolved independently over time. The goal of the flooding protocol of the present invention during this join phase is to retain the latest version, aligning everyone on the same page.

A possibility would be to simply send to the neighbor a copy of each of the local objects, and retain for each one the value with the highest SNUM/AGE combination. A problem with that approach is that if the two databases are almost the same, then a lot of unnecessary traffic results. A preferred embodiment, therefore, is to send a signature of the database, for example a sorted list of the UID/SNUM/AGE combinations. The neighbor will compare this to the local instances, and will push updates for only those messages that are needed. If each neighbor sends a list to its peers, the synchronization can proceed in parallel.

Figure 9:
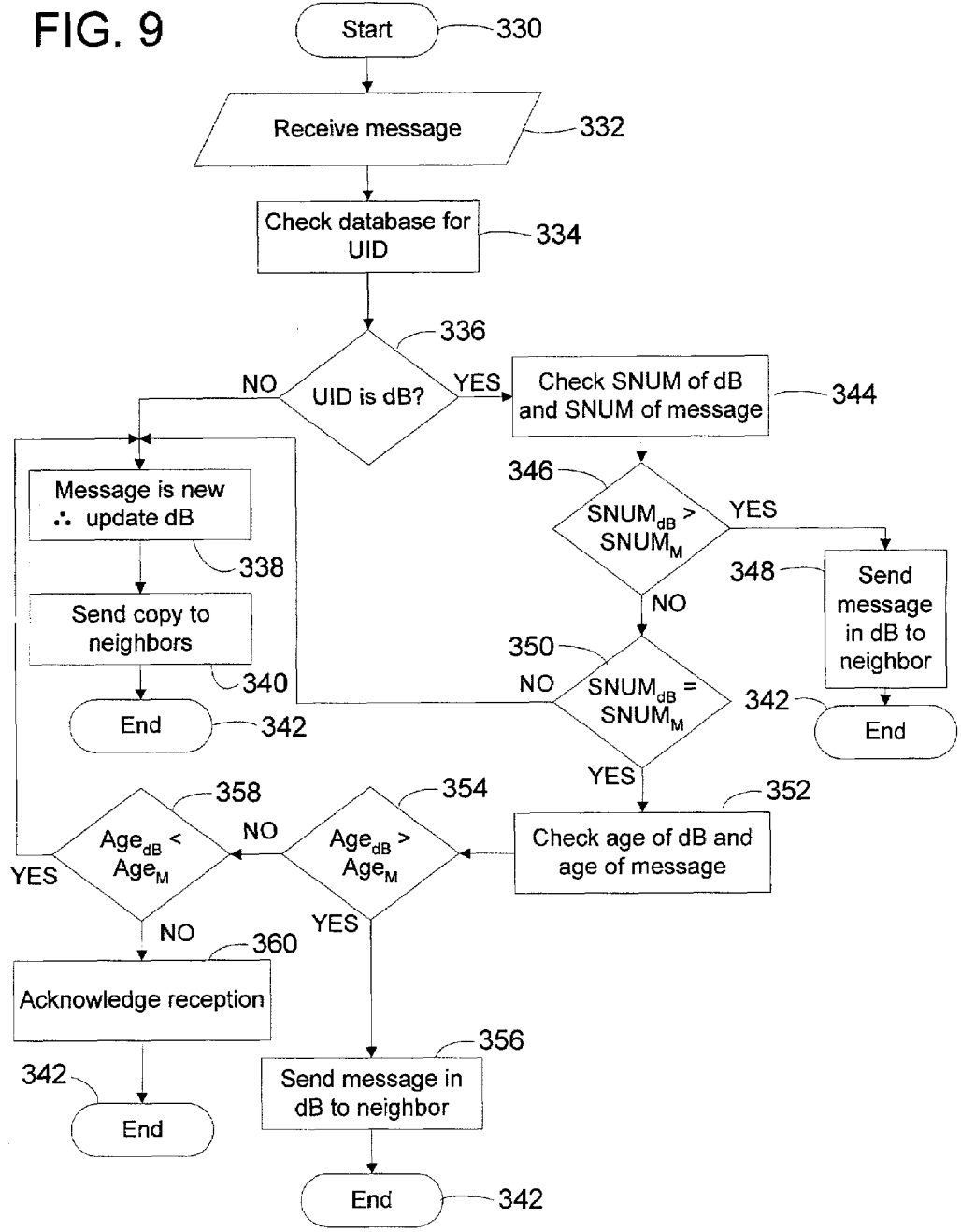
FIG. 9 is a simplified flow diagrammatic illustration of a message processing procedure in accordance with an embodiment of the present invention.

During the run phase, any node can receive a message that contains a copy of an object. Upon reception of this message, the node will first try to determine if the message is new, already present, or old using the algorithm illustrated in simplified flow diagrammatic form in FIG. 9. Once started 330, the node receives 332 a message. The node then looks 334 in the database for the UID of the message. If 336 there is no object in the database with the same UID, the message is new 338 and the node updates its database and sends 340 a copy to its neighbors before ending 342. If 336 there is an object in the database with the same UID, then the SNUM is checked 344. If 346 the SNUM of the message is lower than the SNUM of the copy in the database, the message is old. However, if 350 the SNUM of the message is larger than the SNUM of the copy in the database (a no response at 350), the message is new. The node then updates 338 its database and sends 340 a copy to its neighbors before ending 342.

Additionally, if 350 the SNUM of the message is equal to the SNUM of the copy in the database, then the AGE of the message is checked 352. If 354 the AGE is lower the message is old and a copy of the message in the database is sent 356 to the neighbor to update its database before ending. If 358 the AGE is larger the message is new, and the node updates 338 its database and sends 340 a copy of the message to its neighbors. If the AGE is the same (no responses at both steps 354 and 358), then the message already exists. In this case, there is nothing more to do, except acknowledge 360 reception before ending 342. As is now apparent, if the message is old this means that the neighbor that sent it has an older version than the local one. Therefore, the node sends back a copy of its newer version so that the neighbor's database can be brought up to date. If the message is new, the node just learned something. It then updates its local database and sends a copy of the new message to all of its other neighbors.

If a node decides to change the value of an object, it increments the SNUM and sends a new value to all its neighbors. This procedure creates a potential risk if several nodes change the value of an object at the same time. In such a case, the algorithm becomes indeterminist. To solve this, one embodiment of the present invention assigns an owner to each object. The identification of the owner is then used to construct the UID of the object. In an alternate embodiment, the protocol never allows object values to change. In this embodiment, a delete/create procedure is used instead. In a still further embodiment, one could use a synchronization tool built on top of the flooding system.

In order to delete a copy of an object, one raises the AGE to the maximal value, which the nodes will note as obsolete. A node then floods a new version of the object. The node waits a sufficient time for the update to propagate to all nodes, after which the object can be safely removed from the local database. In one embodiment the deletion procedure interferes with the join procedure discussed above. That is, if a node is offline for a long time and then re-joins the cloud, it may re-inject a copy of an object that was deleted during its absence. To ensure that this does not disrupt the process, one embodiment of the present invention increments the AGE regularly so that records self-destruct if they are not refreshed at regular intervals.

There are many issues in known flooding protocols that are addressed by the system of the present invention. They regard the initialization of sequence numbers, the security issues, the error protection issues, and the handling of database overflows. With regard to the initialization of the sequence numbers, suppose that the master version of a given object is assigned to a specified network node. When that node boots up, it will have to send a copy with some initial sequence number. If the sequence number that the node chooses is lower that the one it previously used, then the local copy may be overwritten by an update received from the network. Nodes should indeed not allow that to happen, because they would have to bounce back and just resend a new copy. However, this takes time, causes extra transmission, etc.

In one embodiment of the present invention it is determined to be safer to use a SNUM that is by definition strictly monotonic, such as a timestamp. While in theory this requires a synchronized clock, in practice synchronization to the second is sufficient. Using a timestamp in place of the sequence number also makes the "obsolete" procedure discussed above easier to develop. In such an embodiment, there is no need to separate an AGE and a sequence number. One can simply assign a maximum duration for any copy, and remove objects whose timestamp is past the duration. As will be recognized by one skilled in the art, there is a compromise between the value of that duration, the number of objects in the system, and the message load.

Error protection is important primarily because flooding protocols involve lots of copying and re-transmitting. There is a non-zero chance that data will be corrupted during these copies, and that corrupted data will then be transmitted to a large set of nodes. All good flooding algorithms attach a checksum to the copy of the data, check the checksum of incoming messages before copying them, etc. It is important to use a strong checksum algorithm. In the system of the present invention, at least CRC32 is used. MD5 or SHA may also be used in accordance with the teachings of the present invention.

Security issues arise because malignant nodes can try to destroy the database by flooding misinformation. As discussed in the above-identified co-pending application entitled Peer-To-Peer Name Resolution Protocol (PNRP) Group Security Infrastructure And Method, the best security is obtained by letting the source of the data digitally sign the update. With such a security infrastructure, each object can be described by a source identifier, related to the source's public key, an object identifier chosen by the source, a timestamp of the last update as set by the source, a time to live, that allows off-line removals, the content, an MD5 checksum of the identifier+timestamp+content, and a signature encrypting the MD5 checksum with the source's public key. Indeed, the MD5 checksum is redundant and could be ignored. The signature needs to be checked only once when the new data is received.

Once the group has been formed and as the group grows, it becomes increasingly important to maintain the group graph to ensure that all of the group communication is reliably and timely flooded to all of the group members. While the flooding protocol defines how a database is consistently replicated to all members of a group, the efficiency of the procedure is conditioned by the shape of the graph. A well-connected graph has a number of good properties that define it. First, a well-connected graph is connected, i.e. a path between any two members may be drawn. Preferably, the graph has a small diameter, i.e. any update is propagated rapidly to all group members. Finally, a well-connected graph must be robust in the sense that it remains connected even if some nodes or some associations disappear.

To ensure that that peer-to-peer groups are well-connected, the system of the present invention defines a graph maintenance protocol that defines how the group can evolve to remain connected and to maintain a small diameter. This is achieved by three procedures. First, a signature procedure computes the signature of a group. If the group is partitioned, each of the partitions will have a different signature. This is used to detect that some correction procedure is required. Second, a reconnection procedure is used that allows nodes to establish appropriate connections at adequate places. Finally, a departure procedure allows nodes to leave a group without creating a hole in the graph.

The signature procedure of the present invention assumes that each node in the group has a unique identifier, which may be defined as a binary number varying between 0 and a maximum M. Furthermore, assume that the identifiers are distributed randomly. For the procedure, the signature of a graph is defined as the lowest value of the identifiers of the connected members. The signature of a graph may then be advertised in a new record type, i.e. the signature record. This record is propagated using special flooding rules, which are a modest superset of the existing flooding rules just discussed. The signature is preferably computed at regular intervals and is exchanged between the nodes by flooding the signature record in the database. This signature record contains the group identifier as the record ID. The version ID is the date at which the record was computed. The record content is the current signature, which is the lowest identifier found during the last computation. In principle, a group's database only contains one such record.

This signature record is flooded to group members using the regular flooding rules discussed above. However, when a local node receives a flooded signature record whose identifier is set to the identifier of the local group, and whose version number is larger than the current number, it performs an additional comparison before accepting the record as new. That is, if the signature in the record is larger than the value of that node's local identifier, the node will immediately create a new record whose content will be set to its local identifier, and whose version number will be set to the current version or to the version of the record ID of the flooded record plus one, whichever is higher. It will then immediately flood this new record to all neighbors, including the one from which it received the original flood request. Similarly, when the signature owner leaves the group, it refreshes the signature record with a node ID of −1, which effectively triggers a signature re-computation. That is, when the signature node friendly leaves, the group signature computation may be started immediately. To achieve this, when the signature node leaves the group, it will flood a new signature record in order to trigger a computation. This is done by obsolescing the current signature. Upon reception of the obsolescence update, each node will pick a timer as specified below, and generate a new signature after the timer has expired.

To ensure that a break in the graph is detected, at regular intervals all nodes compare the value of the signature in the group's signature record to the local copy of the group's signature. If the group identifier is the same as the local value, the node creates a new version of the signature message in which the version number is set to the current time or to the current version plus one, whichever is higher. If there is no signature record, or if the time to live of the signature record has expired, the node will create a signature record whose signature value will be set to its local identifier, and whose version number is set to the current time or to the current version plus one, whichever is higher. The node then floods this record to all its neighbors.

These procedures ensure that the new signature will be computed immediately if a new node joins the graph, and if the identifier of that node is lower than the common signature. Likewise, the new signature will be computed immediately after two disjointed partitions merge, and at every interval as long as the node with the lowest identifier remains connected. The signature may also be computed at some random time after an interval if the current node with the lowest interval leaves the group, or after a disconnection. The cost of doing the computation varies with the type of computation performed. It is linear with the number of nodes, f(N), in the case of a new node joining or if the lowest identifier remains connected. However, it can be as much as $f(N^2)$ if a new minimum has to be elected. This cost is minimized somewhat in one embodiment by having the value of the random interval vary as the ratio of the local identifier to the maximum identifier, M.

In an alternate embodiment of the present invention, the signature update algorithm is changed to include a random timer. In this embodiment instead of immediately creating a new record, the node waits for a random interval before generating a new signature. During the interval, the node may receive updated signature records from other nodes. If one of the new records carries a signature lower than the local identifier, this is recognized as a valid signature. In such a case, the new signature will be immediately accepted and flooded to all neighbors, and the random timer wait is cancelled. If at the end of the random interval the host has not accepted a valid signature, it then generates a new record and floods it to the neighbors. The use of random timers has a damping effect on the general behavior of the signature computation algorithm.

With the signature algorithms there is a possibility, however remote, that two hosts will send updates at the same time. In order to account for such a slight possibility, an alternate embodiment of the present invention modifies the flooding procedure for the signature record if a node receives a duplicate record with the same version number but a different value than the current record. The flooding algorithm discussed above only considers the record-ID and the version number. In this embodiment the nodes additionally consider the checksum. That is, a node considers that an update should be accepted, and flooded, if it has the same ID and version number as a current record, but a strictly larger checksum. This guarantees that the whole cloud converges to a single value for all records. For the signature, this automatically triggers a re-generation of the correct signature by the node with the lowest ID.

In a still further embodiment of the present invention, the timer used before a new signature record is generated is further modified to avoid any avalanche effects. Recalling that updates of the signature occur in two cases, when a new member joins with a lower ID than the current signature, or after the current lowest-ID member leaves, a new member joining generates a single flood, not an avalanche, so this is not problem. However, when the lowest ID member leaves a group, an avalanche of communications trying to establish a new group signature may occur if randomized timers are not utilized. As an alternative to random timers, the system of the present invention generates a timer that is a function of an estimate of the size of the group, and of the likelihood that the current node is the smallest in the group.

It is possible to make smarter decisions if the size of the group were known. The current signature provides a rough estimate of this size. That is, if a group has N members, and if each one picks a number at random between 0 and 1, the probability of having all numbers larger than a minimum value x is P (signature>x)=$(1-x)^N$. This means that the signature will tend to get smaller as the size of the group increases. Indeed, the median of the distribution of the signature for a group of N members may be computed. The median m verifies: P (signature>m)=½=$(1-m)^N$; log (1-m)=-log(2)/N; and therefore m=$1-2^{(-1/N)}$. Conversely, the current value of the signature may be used as an estimate of the size of the group by simply reversing the equation. Therefore, the most likely size N for an observed signature x is N=-log(2)/log(1-x).

As an example of this estimation, a hypothesis is made that the group is large so that it can be assumed that the signature should have the same order of magnitude after the first node leaves and that the signature will be a small number. For small values of the signature s, the relation between signature and size can be approximated as N≈log(2)/s. Suppose now that the signature node has left, the timer has expired, and the members are ready to generate signatures. In accordance with this embodiment of the present invention, each member picks a delay that is related to the probability that the node is the "next minimum." This probability may be expressed as a function of the node's ID, x, and the size of the group as P(other nodes>x)=$(1-x)^{(N-1)}$. At this point, two approximations are made, that N is large, and thus that only stations whose identifier x is small are of interest. Under these conditions, we get the approximation P(other nodes>x)≈$e^{-x \cdot N} \approx e^{-x \cdot log(2)/s} \approx 2^{-x/s}$.

This approximation provides a direct relation between the value of the previous signature and the probability that a given identifier may be the next signature. To avoid collisions, the "round trip" of the group, r, must be taken into consideration. Therefore, a delay t(x) is associated to each signature value x such that the probability of having another node y emit a new signature record during the time period between t(x) and t(x)+r is a small number z. We can obtain this if we assume that t(x)=a(x-s)/s, where a=rlog(2)/b. A reasonable value for r could be one second, and a reasonable value for the coefficient a could be 7, which corresponds roughly to b=1/10.

Indeed, while this approach can produce relatively large delays if the value of s happens to be small, an additional embodiment of the invention limits the value of the delay, and picks a random number when the value of x is large. That is, t =7*(x-s)/s, and if (t>15) then t=15*(1+random(0 . . . 1)). This will limit the risk of collisions in most cases, while ensuring that a minimum is computed in less than 30 seconds.

In an embodiment of the present invention wherein peer-to-peer groups are organized to allow the formation and usage in a chat-type environment, these groups are organized as a hierarchy. On top is a "list of channels" group, to which everyone subscribes. Under this top group are "channel" groups to which only channel members subscribe. Each such channel group maintains its own graph. To use the signature efficiently in this environment, the channel contact record defined herein needs to be updated to add signature information. The RECORD_CHANNELCONTACT includes a general header, the contact address in an IPv6 format, the contact port number, the contact transport type (UDP/TCP) flag, the current signature of the group as observed by the contact, the contact name size in bytes, and the actual contact name string. The contact hosts are responsible for updating the record whenever their perception of the group signature changes. Additionally, the contact information needs to be propagated in other groups.

In an embodiment of the present invention, the "list of group" channel is the only one that contains information about other channels. However, a method to very simply ensure redundancy in the graph is to allow each channel to have contact information about other channels. A simple application is to list contacts for the list of group channel in the regular channels.

The group signature information is used to detect and allow reconnection of a partitioned channel. That is, if a group's graph gets partitioned, members in each of the partitions will, after some time, observe a different signature. Each node that subscribes to both the "list of group" channel and a "group" channel will monitor the group signature advertised in the channel contact records. Partitioning is detected if the signature of a contact differs from the value in the signature record of the group. In this case, the host will start a random timer. If partitioning is still detected at the end of the timer, the node will attempt to join the channel contact in the group context, thus reconnecting the two partitions.

If the list of group's graph gets partitioned, each of the partitions will, after some time, also observe a different signature. Each node that subscribes to both the list of group channel and a group channel will monitor the list of group signature advertised in the contact records for the list of group channel. Partitioning is detected if the advertised signature of a participant's copy of the "list of channel signature record" differs from the local signature of the list of groups. In this case, the host will also start a random timer. If partitioning is still detected at the end of the timer, the node will attempt to join the "list of group channel" through one of the list of channel contacts that has a lowest signature, thus reconnecting the two partitions.

In a more general group environment, to detect a partition in a group each contact record in the group carries the group signature perceived by the contact node. If there is a partition in the group, over time, the signature expressed in the contact record will disagree with that stored in the local node. Should such a discrepancy exist, the node first takes a random back off. After the expiration of the random back off, if the discrepancy persists, the node establishes a connection with the contact node whose perceived signature is different. This serves to reconnect the two partitions.

Figure 10:
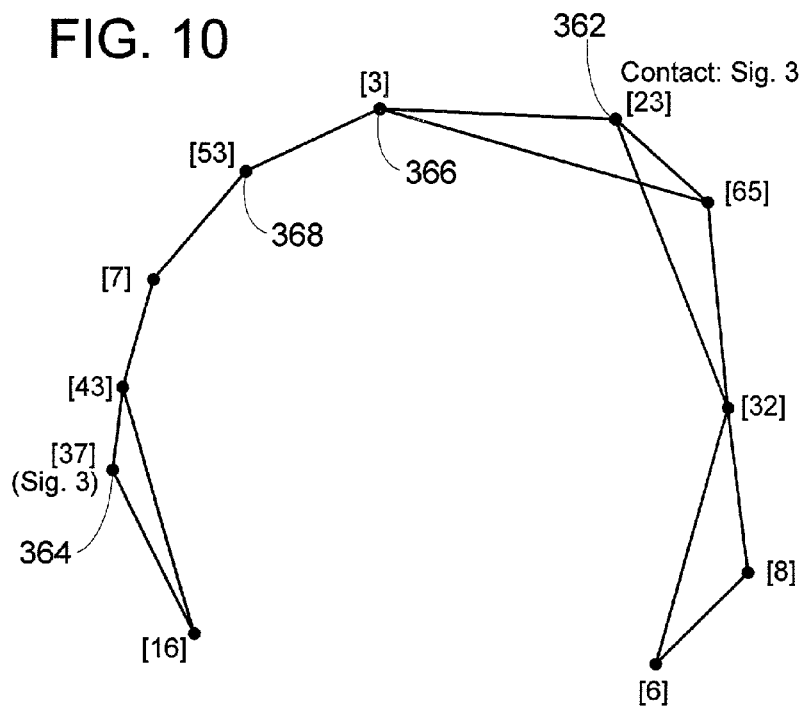
FIG. 10 is a simplified peer-to-peer graph illustrating information from which a group signature is perceived.
Figure 11:
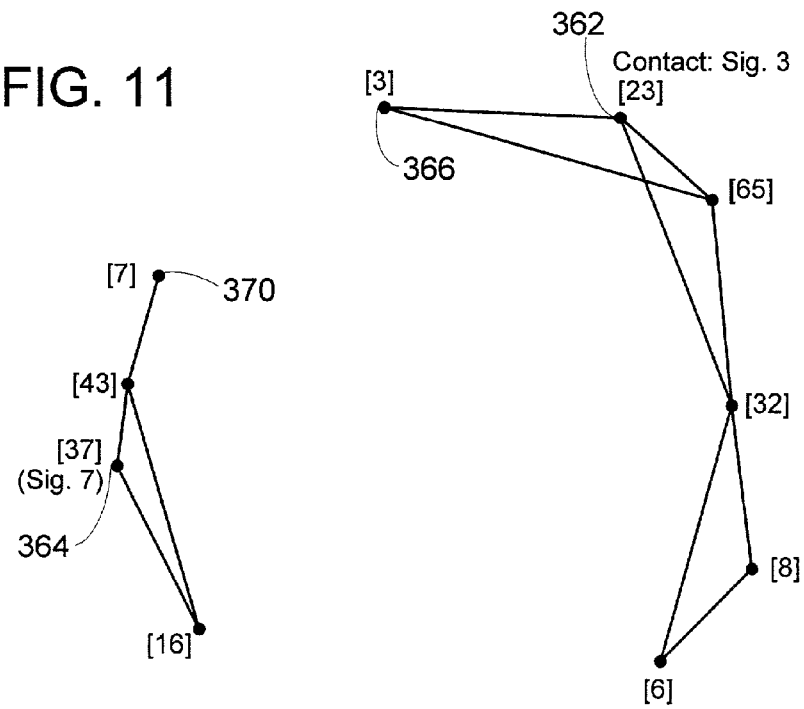
FIG. 11 is a simplified peer-to-peer graph illustrating the graph of FIG. 10 having sustained a graph break.
Figure 12:
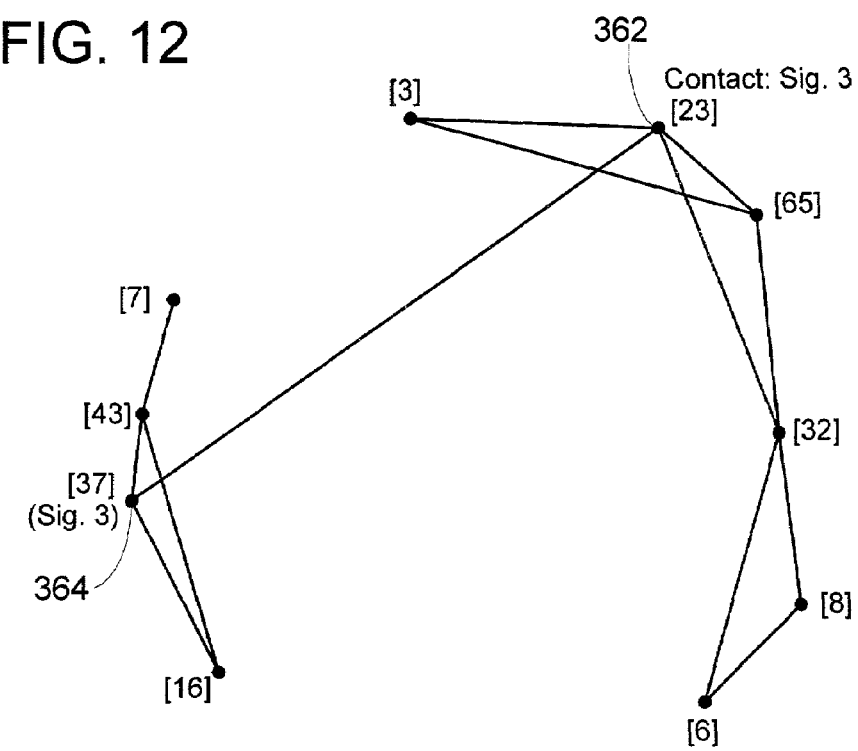
FIG. 12 is a simplified peer-to-peer graph illustrating the graph of FIG. 10 having reconnected the graph break in accordance with an aspect of the present invention.

An example of this process is illustrated in FIGS. 10, 11, and 12. In FIG. 10 a graph of a peer-to-peer group is represented. The peers are illustrated as nodes, and the peer neighbor connection relationships are illustrated as lines joining the nodes. In this exemplary graph, the node IDs are represented by a number in square brackets. Node 362 is designated as a contact for the group. The group signature for this graph is 3, reflecting node 366's ID as the lowest in the group. This group signature is seen by all nodes in the group, including node 364.

If node 368 were to leave the group without notifying its neighbors, a partition in the graph occurs as illustrated in FIG. 11. The portion of the graph having the contact node 362 also includes node 366. Therefore, this portion of the graph sees no change in the group signature. However, the portion of the graph having node 364 will eventually see a new signature of 7, reflecting that node 370 is now the node with the lowest ID in the graph. When this signature discrepancy is detected by, e.g., node 364 as discussed above, it will contact the contact node 362 to reconnect the group. Such a reconnected group is illustrated by the graph of FIG. 12.

Besides graph partition and reconnection, graph maintenance in accordance with the present invention also entails maintaining a cloud in good shape. A good shaped cloud is one that enables fast transmission, while providing a high degree of resiliency against partitioning. To achieve this result, the system of the present invention allows a cloud to change its shape continually, in order to converge towards a desirable graph. To do so, the present invention allows the nodes to pick new neighbors, and allows them to drop existing neighbor relations when these relations are not productive. This is facilitated through neighbor connection assessments. That is, in order to maintain a graph in good shape, the node assesses what is the desirable number of neighbors, which of these neighbors are really useful, and also the graph diameter.

With respect to the number of neighbors, there is obviously a limit to the number of neighbors that any given node can manage. Each node utilizes two parameters, a minimum number of neighbors and a maximum number of neighbors. Based on these parameters, a node will try to initiate new connections in a given group at random intervals if it currently has less neighbors in that group than the minimum number, or just the minimum. Additionally, a node will accept connection requests if it currently has less neighbors than the minimum numbers. It may also refuse new requests if the maximum number has been reached. Finally, a node that has more neighbors than the minimum number may consider dropping some of its connections, at random intervals. The value of the minimum and maximum parameters should be a function of the node's capacity. In one embodiment, the minimum is set to 2, and the maximum is set to 8.

In an alternate embodiment three parameters are used with respect to the number of neighbors. In this alternate embodiment the minimum number of connections is set to be 5. When a peer joins a group, it tries to establish the minimum number of connections as soon as possible. It tries to establish some new connection as soon as the first SOLICIT-ADVERTISE-REQUEST cycle is done. It then will try on a periodical basis to get the minimum number of connections. A peer normally achieves the minimum number of connections in a matter of seconds. The second parameter is an ideal number of connections that a node preferably maintains. In one embodiment the ideal number of connections is set to be 10. On a periodic basis, a peer tries to maintain its active connection number to be this. It initiates a new connection if the current active number of connections is below this threshold. It drops a connection with the lowest utility index when the number of active connections goes above this number. The final parameter is the maximum number of connections, which is set to 15 in one embodiment. A peer will refuse any incoming connection request if it already has this number of connections. When a connection refuse happens, it returns the current connected neighbor list as will be discussed below. The other party will then randomly pick neighbors to connect from this list. The recommendations from multiple refusals are put into a list and nodes are selected randomly from the list until a connection is established, or a maximum number of retries is reached.

Besides assessing the number of connections, the maintenance of a good graph requires that the actual value of the neighbor connections also be assessed. Having multiple neighbor connections implies that some of the flooded messages will be received many times. When a node receives a flood update, the flood update may trigger an update in the database, in which case the message is considered useful. Or, it may be a duplicate reception of an already existing record, in which case the message is considered useless. In one embodiment, this information is carried in the flooding acknowledge message so that the neighbor can also assess how useful his transmissions are.

Counting useful and useless receptions gives an idea of the usefulness of a given neighbor. Rather than actually counting messages, a simple solution is to maintain a utility index according to the following procedure. To begin, let $U(X)$ be the utility index associated to neighbor X. Upon a join or welcome, the utility index $U(X)$ is initialized to 0. Upon reception of a useful flood update, or upon reception of a flooding acknowledgement mentioned as useful, compute $U(X)=(U(X)*(1-\frac{1}{32}))+128$. Upon reception of a useless flood update, or upon reception of a flooding acknowledgement mentioned as useless, compute $U(X)=(U(X)*(1-\frac{1}{32}))$. This procedure provides an exponentially smoothed index of the usefulness of the last messages. If all messages were useful, the index would tend towards 4096. If all messages were useless, it would tend towards 0. Therefore, when a node decides to drop a connection, it can choose to disconnect from the neighbor that has the lesser or lower utility index.

In addition to these two graph maintenance techniques, an embodiment of the present invention also determines the graph diameter. The graph diameter relates to the number of hops that a message must make before all nodes in the graph receive that message. The larger the diameter, the more time that is required before all nodes receive updated information, and the more likely that a partition may occur. Obviously, a minimum diameter is 1, i.e. each neighbor is connected to all other neighbors. However, the mechanisms just discussed may limit the ability or desirability of such a diameter, especially as the group grows. Therefore, maximum and ideal graph diameter parameters are used to aid in the neighbor selection process. In one embodiment of the present invention, the maximum diameter is 4, and the ideal diameter is 3. If a node detects that the graph diameter is greater than the maximum, it attempts to connect to another neighbor to reduce the graph diameter.

Figure 13:
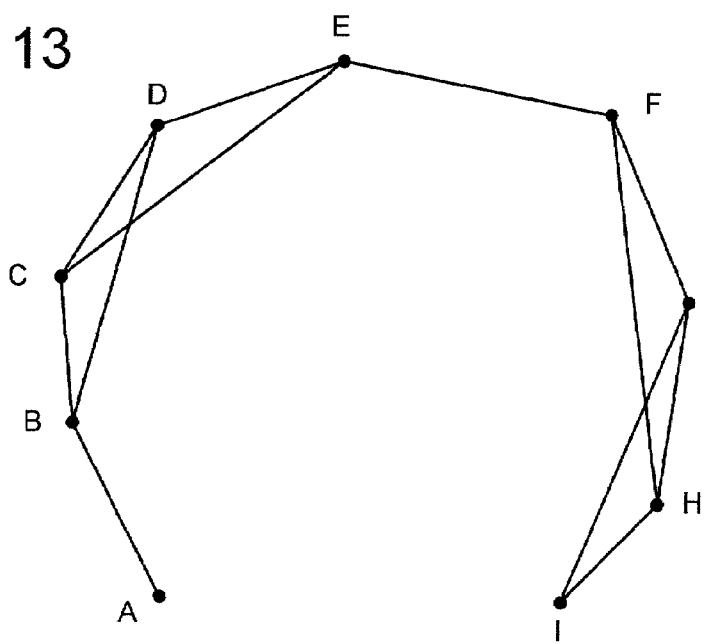
FIG. 13 is a simplified peer-to-peer graph illustrating the determination of a graph diameter.
Figures 14, 15:
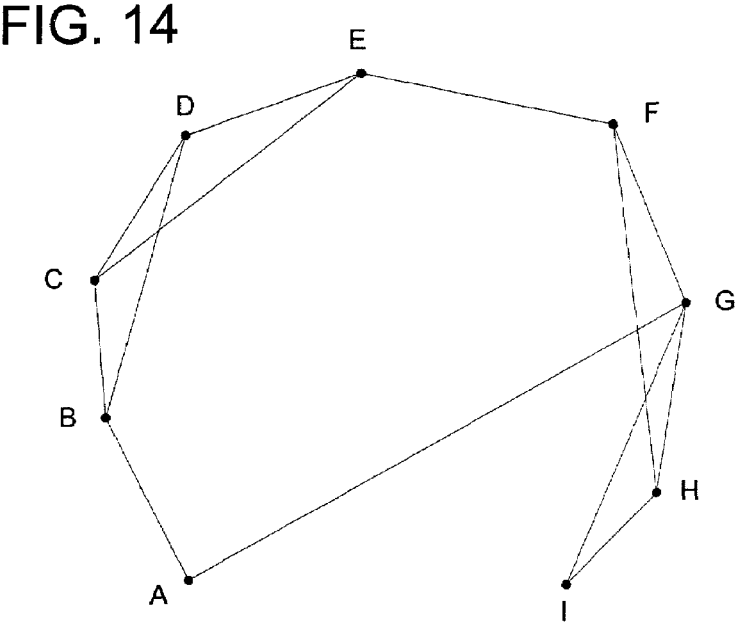
FIG. 14 is a simplified peer-to-peer graph illustrating a modification to the graph of FIG. 13 to reduce the graph diameter.
FIG. 15 is a simplified data structure diagram illustrating a disconnect message constructed in accordance with an aspect of the present invention.

As an example of the graph diameter maintenance, reference is made to FIGS. 13 and 14. In the exemplary peer-to-peer group of FIG. 13, the graph diameter is equal to six. This is calculated as the maximum number of hops that a message must traverse before it reaches its most distant group member. In this exemplary graph, a message from node A must pass through six hops before it reaches node I. As discussed above, however, this number exceeds the parameters on such diameter. Therefore, when a node recognizes this situation it contacts another neighbor in an attempt to reduce the graph diameter. In the graph of FIG. 14, node A has connected, e.g., to node G. As a result of this reconnection, the graph diameter is now reduced to four. That is, the maximum number of hops that a message must traverse to reach all group members is four.

Besides assessing the neighbor connections once connected, graph maintenance also requires that neighbor connections are properly selected in the first place. After initially joining a group, a node will have acquired a list of participants as discussed above. The node can try to join a new neighbor by picking at random a participant in the list and issuing a join request to that participant. In the case of the "list of group" groups, the node can select a neighbor by picking at random any of the nodes that advertise their address as a contact for a group. In the case of the initial join to any other group, the node can select at random one of the advertised contacts for that group. If the neighbor that is picked by this random process currently has less than the maximum allowable number of neighbors, it will accept the connection. If it has already reached a maximum number, it will refuse the connection.

In the case of normal groups, after a refusal the node can pick a new neighbor at random in the list of participants, and try to join that neighbor. There is a problem with the refusal in the case of the "list of groups," because there is no complete list of participants. There is also a problem in the case of the initial join to any other group because a node does not yet know the participant list of that group. In these cases, the node that refuses the connection provides an alternative, i.e. the name and addresses of other group members that may or are ready to accept connections. An exemplary embodiment of such a refusal message 326 is illustrated in FIG. 7. In one embodiment the node provides a list of the existing neighbors. The node that receives the refusal message will pick at random a neighbor in the list, and will try to join. To distinguish between the two cases, one embodiment of the present invention adds a parameter to the join message. This parameter states whether a list of neighbors is requested or not upon a refusal to accept the connection. The cycles of refusal/retry should be limited in time, at least when the node trying to join already has one neighbor.

When a node removes a connection, i.e. disconnects itself from the group, it sends a disconnect message. An exemplary embodiment of such a disconnect message 372 is illustrated in FIG. 15. However, this can potentially create a hole in the graph. To diminish the risk of creating such a hole, the node selects one of its neighbors as a reconnection point. Preferably, the node picks the neighbor that has the best utility index. The disconnect then carries the information about that neighbor, e.g. name, address and port. When a node receives a disconnect message from a neighbor, it tries to connect to the suggested alternative. It sets the parameters in the join message to indicate that a list of neighbors is requested if that node refuses to accept the connection to prevent the unintended creation of a hole in the graph. If the connection is refused, then the neighbor should attempt to connect to one of the other neighbors provided in the list.

Figure 16:
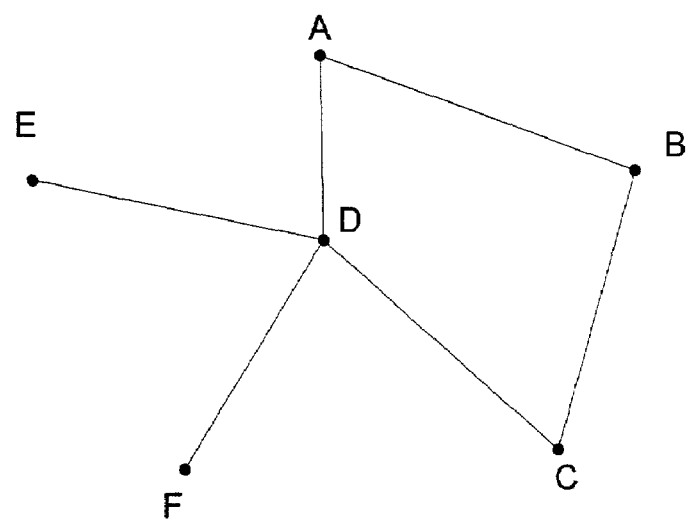
FIG. 16 is a simplified peer-to-peer graph constructed in accordance with the teachings of the present invention.
Figure 17:
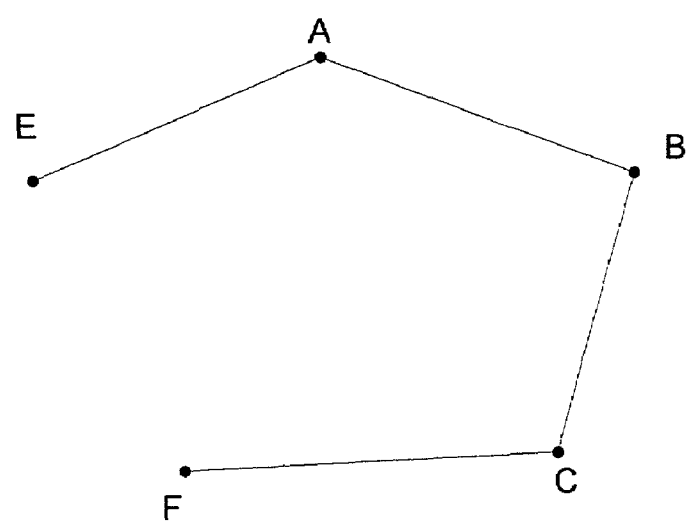
FIG. 17 is a simplified peer-to-peer graph re-constructed in accordance with the teachings of the present invention once one of the members has left the group.

An example graph illustrating this disconnect process is illustrated before and after such a disconnect in FIGS. 16 and 17, respectively. In FIG. 16, nodes E and F are connected to the group only through node D. If node D were to depart the group without informing E and F of the departure, they would be excluded from the group. However, in accordance with an embodiment of the present invention, node D provides to nodes E and F its neighbor list. This allows nodes E and F to remain connected to the group by contacting a node from the list. In FIG. 17, node D has left the group, and node E has contacted node A (one of node D's former neighbors) and node F has contacted node F (also one of node D's former neighbors). In this way, all remaining nodes are able to maintain the group in tact.

As an application illustrating the above described peer-to-peer group management and graph maintenance techniques of the present invention, the following will discuss a peer-to-peer chat application. This exemplary system demonstrates the flooding and simple graph management techniques in peer networks to aid in an understanding of the mechanisms discussed above. This exemplary application provides basic chat functionality without relying on a central server. It is a server-less implementation of internet relay chat (IRC) channels, allowing users to initiate, discover, participate in, and delete peer chat sessions. Through the following description the viability of peer technologies in a well-known domain, i.e. group chat, is demonstrated.

Peers must be a member of a peer cloud to participate in chat channels. Each peer cloud has a default channel (the "list of group" channel), and zero or more peer-created channels (PCCs). Each channel has a database of replaceable records contributed by channel members. The default channel's database contains a list of active chat channels and addresses of channel contacts and is distributed to all peers. Peers wishing to join a channel will negotiate entry with one of that channel's contacts. A PCC database is a collection of recent messages transmitted on that channel. A time-based display of these messages shows the conversation. Unlike the default channel's database, a PCC database is distributed only to peers who have joined that channel. The database records have a lifetime, and when a record lifetime expires, the record is deleted from the database. However, records may be kept alive by occasionally flooding a new version of that record. Any peer may update a channel database by flooding a record, which is propagated to every channel member.

The application of the above mechanisms in this exemplary peer-to-peer chat application highlights four main components of such a system. First is the peer rendezvous, which includes finding, joining, and leaving chat channels. Second is the shared database management. Each channel has a shared database of unique records. However, peers' copies of a database may not match one another. Therefore, the shared database management protocol will minimize differences between database copies. Third, the peer-to-peer chat graph maintenance is illustrated. This maintenance overlaps somewhat with rendezvous, because entering and leaving a channel changes graph topology. Maintenance also includes, however, reconnecting when a graph break is detected as discussed above. Finally, an exemplary user interface (UI) is described. However, since the following only presents an exemplary system, the UI illustrated is only a Spartan interface presented merely to illustrated aspects of the present invention.

The peer-to-peer chat system discussed below is basically a server-less replacement for IRC. This system supports many chat rooms, each of which are identified by a name. Participants connect to a "root" group (default channel) to learn about the various chat rooms, and then to a specific room in which they want to participate. The root group will use flooding to replicate the list of available chat rooms to all its members. Members are allowed to create new rooms, which is a demonstration of the flooding algorithm discussed above. In the root group, the system will maintain a list of connectors, i.e. the addresses of group members that are ready to connect peers to a specific chat room. Chat messages are exchanged directly between the chat room members that are active at a given time. For this, the system uses a variation of the flooding algorithm discussed above that considers each chat message as a short-lived object.

Figure 18:
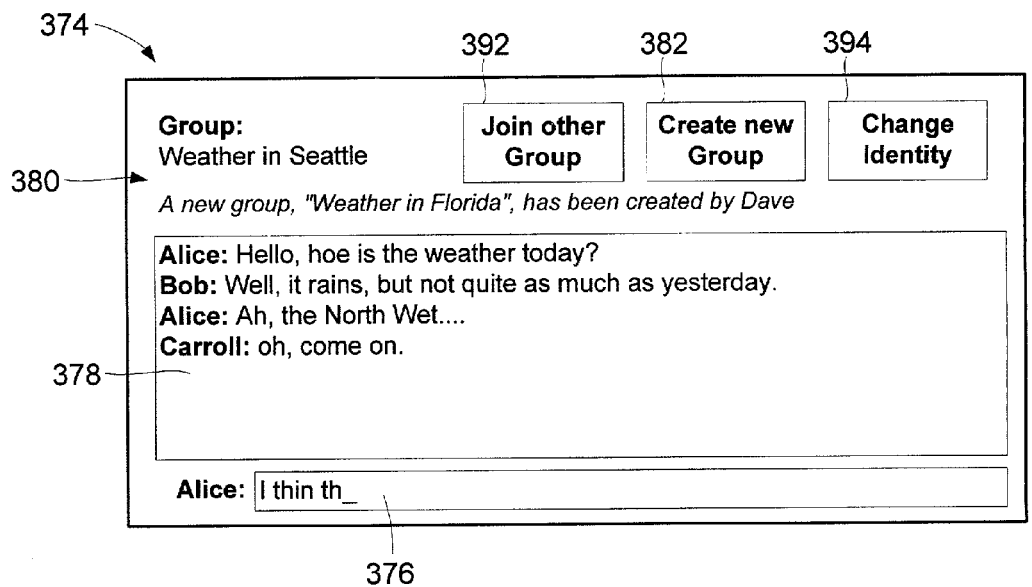
FIG. 18 is a simplified peer-to-peer chat user interface (UI) illustrating aspects of the present invention as applied to a chat application.

FIG. 18 illustrates an exemplary chat window 374 to aid in the understanding of the peer-to-peer chat system. That is, once a user has joined a group, the chat window 374 may look like the UI of FIG. 18. In this exemplary application, the user (denoted as "Alice") has joined the group "Weather in Seattle." She composes her messages in the text input box 376 at the bottom of the window 374. The messages sent by the group participants are flooded to all active group members, and displayed in the text box 378 at the center of the window 374. The text will roll in the window, as the time-to-live of these messages expires. If another group is created, a message appears in the "system communication" textbox 380 alerting the peer members to its existence.

Figure 19:
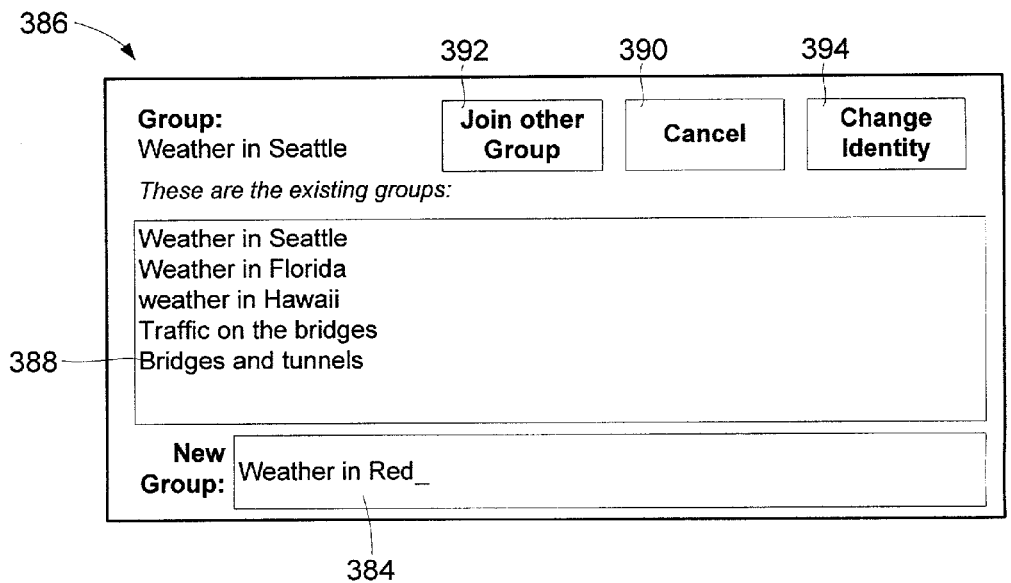
FIG. 19 is a simplified peer-to-peer chat user interface (UI) illustrating other aspects of the present invention as applied to a chat application.

When she is done chatting about the weather in Seattle, the user may decide to create a new group, such as, for example, "Weather in Redmond." To do this she clicks on the "Create New Group" button 382, and is prompted to enter the name of the new group in the text input window 384 in the UI 386 of FIG. 19. The name of the new group is then flooded to all group members and a message will appear briefly in the "system communication" textbox 380, as discussed above.

This group creation UI 386 displays all of the existing active groups in the main window 388. Note that Alice can at any time "cancel" 390 and return to the previous screen, or decide to join an existing group 392 instead, or take the time to change her identity 394 or nickname by selecting the appropriate button.

Figure 20:
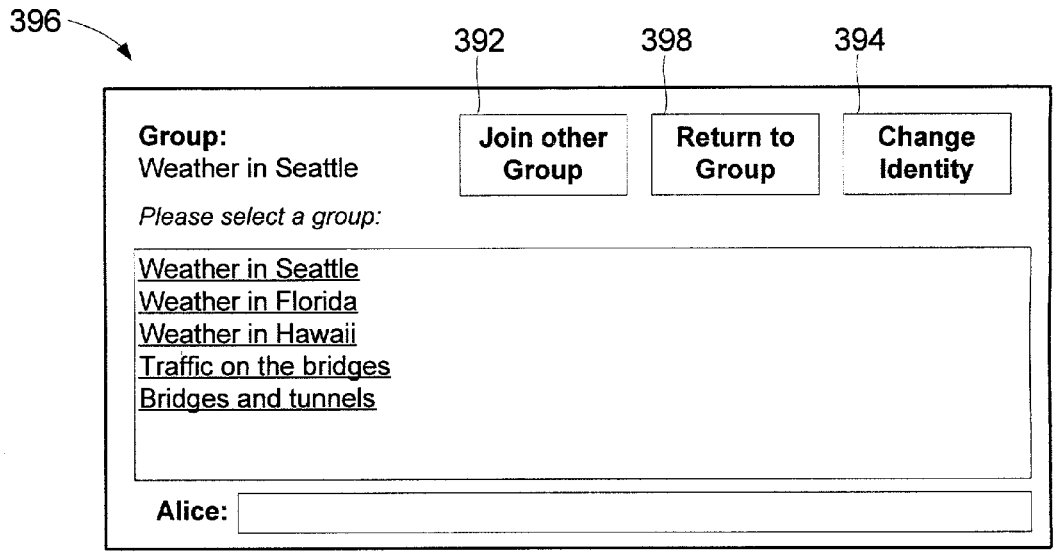
FIG. 20 is a simplified peer-to-peer chat user interface (UI) illustrating further aspects of the present invention as applied to a chat application.

The user can also join another group by selecting the "join other group" button 392. The window will then change to that illustrated in FIG. 20 as 396, to present the list of active groups. The user selects a group by clicking on the appropriate line for that group. This triggers the join protocol discussed above. The system will contact the peers that are listed as contact points for the selected group, and will establish a peering relation. At the same time, the system will terminate the peering relation that may have been established with a previous group. It does so in an orderly fashion so that the group that it quits remains connected. Note that the user can at any time cancel 398 and return to the previous screen.

Figure 21:
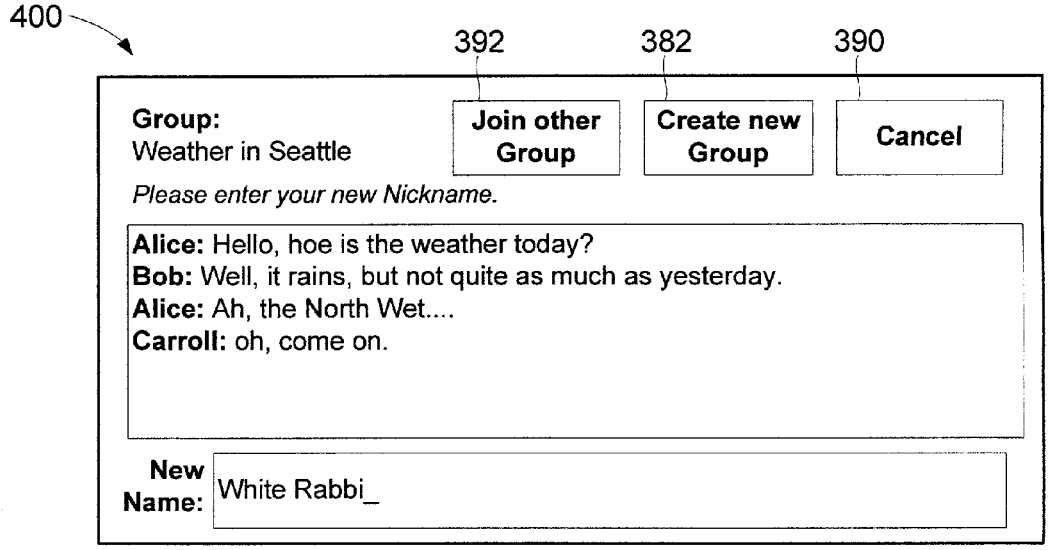
FIG. 21 is a simplified peer-to-peer chat user interface (UI) illustrating still further aspects of the present invention as applied to a chat application.

If the user decides to change her name, she selects the "change identity" button 394. The UI window changes to a fourth state 400 as illustrated in FIG. 21 in which the user will be polled for the new name. The user, here again, can at any time decide to abort the name changing process by selecting the cancel button 390.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of forming a peer-to-peer group within a peer-to-peer cloud, the group having a plurality of peer nodes, the method comprising the steps of:
   selecting at least one friendly name for the group ($NAME_G$), wherein the friendly name collectively identifies the peer-to-peer group;
   calculating a category identification (CID) for the group from the at least one friendly name;
   providing the CID to at least one peer node within the peer-to-peer cloud, wherein the CID allows the at least one peer node within the peer-to-peer cloud to communicate directly to the peer-to-peer group; and
   concatenating a peer ID with the CID to derive CID:ID, and registering CID:ID with a peer-to-peer name resolution protocol (PNRP) for discovery therethrough.

2. The method of claim 1, wherein the step of calculating the CID comprises the step of hashing the $NAME_G$ with a seed GROUP.

3. The method of claim 1 wherein the peer-to-peer group is to be private, wherein the step of providing the CID to a peer comprises the step of sending the CID to the peer out of band.

4. The method of claim 1 wherein the peer-to-peer group is to be public, wherein the step of providing the CID to a peer comprises the step of registering the CID with the peer-to-peer name resolution protocol (PNRP) for discovery therethrough.

5. The method of claim 1, further comprising the steps of receiving a connect message from the peer and returning a welcome message to the peer.

6. The method of claim 5, further comprising the steps of calculating a signature of a group object database, and sending the signature to the peer.

7. The method of claim 6, wherein the step of calculating the signature of the group object database comprises the steps of combining a unique identification (UID), sequence number (SNUM), and age for each group object in the group object database, and sorting a list of the combined UIDs/SNUMs/ages for the group objects.

8. The method of claim 6, further comprising the steps of receiving a request for specific group objects from the peer, and transmitting the specific group objects to the peer.

9. The method of claim 1, further comprising the steps of receiving a connect message from the peer and returning a refuse message to the peer along with a list of other members of the group.

10. A computer-readable storage medium storing computer-executable instructions that perform the method of claim 1.

* * * * *